(12) United States Patent
Helmrich et al.

(10) Patent No.: US 12,519,961 B2
(45) Date of Patent: Jan. 6, 2026

(54) APPARATUS AND METHOD FOR IMPROVING VIDEO ENCODING

(71) Applicant: Fraunhofer-Gesellschaft zur Förderung der angewandten Forschung e.V., Munich (DE)

(72) Inventors: Christian Helmrich, Berlin (DE); Anastasia Henkel, Berlin (DE); Tobias Hinz, Berlin (DE); Adam Wieckowski, Berlin (DE); Benjamin Bross, Berlin (DE); Detlev Marpe, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/438,543

(22) Filed: Feb. 12, 2024

(65) Prior Publication Data

US 2024/0283953 A1   Aug. 22, 2024

(30) Foreign Application Priority Data

Feb. 17, 2023  (EP) .................................... 23157413

(51) Int. Cl.
| | |
|---|---|
| H04N 19/196 | (2014.01) |
| H04N 19/137 | (2014.01) |
| H04N 19/172 | (2014.01) |
| H04N 19/177 | (2014.01) |

(52) U.S. Cl.
CPC ......... *H04N 19/196* (2014.11); *H04N 19/137* (2014.11); *H04N 19/172* (2014.11); *H04N 19/177* (2014.11)

(58) Field of Classification Search
CPC .. H04N 19/196; H04N 19/137; H04N 19/172; H04N 19/177
See application file for complete search history.

(56) References Cited

U.S. PATENT DOCUMENTS

| 6,556,624 B1 * | 4/2003 | Orchard | H04N 19/146 |
| | | | 375/E7.22 |
| 6,864,909 B1 * | 3/2005 | Horowitz | H04N 19/15 |
| | | | 375/E7.182 |

(Continued)

FOREIGN PATENT DOCUMENTS

| CN | 102724510 A | 10/2012 |
| JP | 2004135252 | * 10/2002 |
| TW | 201737712 | * 3/2017 |

OTHER PUBLICATIONS

Wieckowski, A., et al.; "VVenC: An Open and Optimized VVC Encoder Implementation;" Proc. IEEE Int. Conf. Multimedia and Expo (ICME); Jul. 2021; pp. 1-2.

(Continued)

*Primary Examiner* — Zaihan Jiang
(74) *Attorney, Agent, or Firm* — McClure, Qualey & Rodack, LLP

(57) ABSTRACT

An apparatus and method determine quantization parameter for a second rate-control pass of a video encoder for a group of pictures based on an encoding bitrate and further quantization parameter of a first rate-control pass of the video encoder for the group of pictures. The apparatus is configured to determine, for each of positions spatially distributed over frames of the group of pictures, a dissimilarity measure or a similarity measure of a comparison of a first frame portion at the respective position, and a second portion of a reference frame to which a motion vector of an estimated motion field at the respective position points. The apparatus is configured to form a representative scalar value based on the dissimilarity measures or similarity measures determined for the positions. The apparatus is further configured to determine a preliminary quantization parameter for the second rate-control pass based on the encoding bitrate.

6 Claims, 9 Drawing Sheets

(56) References Cited

U.S. PATENT DOCUMENTS

| | | | | |
|---|---|---|---|---|
| 6,987,889 | B1* | 1/2006 | Horowitz | H04N 19/124 375/E7.182 |
| 2008/0225944 | A1* | 9/2008 | Pore | H04N 19/124 375/240.03 |
| 2011/0249076 | A1* | 10/2011 | Zhou | G06F 3/04886 348/14.02 |
| 2013/0322524 | A1* | 12/2013 | Jang | H04N 19/167 375/240.03 |
| 2014/0376616 | A1* | 12/2014 | Li | H04N 19/154 375/240.03 |
| 2015/0256850 | A1* | 9/2015 | Kottke | H04N 19/513 375/240.16 |
| 2019/0116362 | A1* | 4/2019 | Jun | H04N 19/159 |
| 2019/0166180 | A1* | 5/2019 | Zhao | H04L 65/70 |
| 2019/0394466 | A1* | 12/2019 | Gao | H04N 19/147 |
| 2020/0275103 | A1* | 8/2020 | Zhao | H04N 19/142 |
| 2020/0275104 | A1* | 8/2020 | Zhao | H04N 19/174 |

OTHER PUBLICATIONS

Wieckowski, A., et al.; "An Optimized Temporal Filter Implementation for Practical Applications;" Proc. IEEE Picture Coding Symposium (PCS); Dec. 2022; pp. 247-251.

Andersson, K., et al.; "AHG3 Recommended Settings for HM;" Joint Collaborative Team on Video Coding (JCT-VC) of ITU-T SG 16 WP 3 and ISO/IEC JTC 1/SC 29/WG 11; JCT-VC document JCTVC-X0038; May 2016; pp. 1-5.

Helmrich, C.R., et al.; "A Scene Change and Noise Aware Rate Control Method for VVenC, an Open VVC Encoder Implementation;" Proc. IEEE Picture Coding Symposium (PCS); Dec. 2022; pp. 1-5.

Martin, R.; "An Efficient Algorithm to Estimate the Instantaneous SNR of Speech Signals;" Proc. Euro-Speech, Berlin; Sep. 1993; pp. 1-4.

De Lagrange, P.; "AHG4: Experiments in Preparation of Film Grain Visual Tests;" Joint Video Experts Team (JVET) of ITU-T SG 16 WP 3 and ISO/IEC JTC 1/SC 29; JVET document JVET-AC0181-v1; Jan. 2023; pp. 1-5.

Partial European Search Report dated Mar. 14, 2024, issued in application No. EP 24157382.3.

Helmrich, C.R., et al.; "Xspnr: A Low-Complexity Extension of the Perceptually Weighted Peak Signal-to-Noise Ratio for High-Resolution Video Quality Assessment;" Video Coding and Analytics Department; 2020; pp. 2727-2731.

Helmrich, C.R., et al.; "Visually Optimized Two-Pass Rate Control for Video Coding Using the Low-Complexity XPSNR Model;" Proc. IEEE Int. Conf. Visual Communications and Image Processing (VCIP); Dec. 2021; pp. 1-5.

\* cited by examiner

400

402 — determine, for each of positions spatially distributed over a current frame, a dissimilarity measure or a similarity measure of a comparison of a first portion of the current frame at a respective position, and a second portion of a reference frame to which a motion vector of an estimated motion field at the respective position points 404 — form a central value over the dissimilarity measures or similarity measures determined for the positions 406 — determine the SCC indicator based on the central value

502 — determine, for each of positions spatially distributed over frames of the group of pictures, a dissimilarity measure or a similarity measure of a comparison of a first frame portion at the respective position, and a second portion of a reference frame to which a motion vector of an estimated motion field at the respective position points

504 — form a representative scalar value based on the dissimilarity measures or similarity measures determined for the positions

506 — determine a preliminary quantization parameter for the second rate-control pass based on the encoding bitrate, the further quantization parameter of the first rate-control pass and an intended bitrate for the second rate-control pass

508 — adjusting the preliminary quantization parameter using the representative scalar value to obtain the quantization parameter for a second rate-control pass

602 — determining a preliminary QP value for a block QP based on first-pass quantization parameter information determined by a first rate-control pass of the video encoder for the respective block 604 — determine a noise level equivalent QP based on an analysis of sample statistics within the respective block 606 — correct the block QP by subjecting the preliminary QP value and the noise level equivalent QP to a maximum function 608 — determine a group QP based on the first-pass quantization parameter information 610 — determine a central value over the block QP of the blocks within the respective group 612 — if the central value exceeds the group QP, decrease the block QP of one or more blocks within the respective group

Fig. 10

APPARATUS AND METHOD FOR IMPROVING VIDEO ENCODING

Embodiments according to the invention relate to apparatuses and methods for improving video encoding, e.g., using motion estimation data of picture pre-filtering.

Modern video encoders are highly optimized, for example with regard to input type detection or classification (e.g., screen content coding, SCC vs. natural camera content) and rate control (e.g., multi-pass rate control, RC). For example, VVenC, an open encoder generating Versatile Video Coding (VVC) compliant bitstreams [1], utilizes a frame-wise SCC classifier based on the combination of collected block-wise low-order statistics, specifically, the arithmetic mean (first mathematical moment) and variance (second moment). Based on the results of this classifier, certain compression techniques may be activated or deactivated, thereby allowing highly optimized tradeoffs between encoding performance and speed for each video input type. Moreover, a sequence-wise or frame-group-wise two-pass RC scheme is integrated [2], gathering frame-wise rate and quantization parameter (QP) data in a first, fixed-QP encoding pass and leverages this information to, during the second pass, re-encode the input frames with adapted rates and QPs in a manner which, on average, allows the resulting bitstream to closely match the user defined bitrate. For acceptable total encoding speed, the first pass is configured to run much faster than the second pass, with fewer encoding tools being enabled and with a higher overall QP.

Video encoders may further include pre-filtering schemes which apply (e.g., motion compensated) denoising to all, or at least some periodic, frames of the input video in order to improve the encoding performance. A motivation behind such motion compensated temporal pre-filtering (MCTPF) approaches [3] is the observation that, for example, film grain or sensor noise reduces the effectiveness of predictive compression techniques in hybrid video coding, thus increasing the coding rate consumption. Removing the noise a priori is, therefore, desirable.

VVenC and similar video encoders, although generally operating with satisfactory compression efficiency and encoding speed, show suboptimal behavior on some camera captured natural picture content. This behavior may be manifested in comparatively low peak signal-to-noise (PSNR) or comparable measurement values at a certain coding bitrate and may be attributed to the following three aspects of temporally hierarchical hybrid coding:

Aspect 1: Deactivation of MCTPF on Input Frames Classified as SCC

In VVenC, the SCC classifier is run before the MCTPF preprocessor. This allows said MCTPF preprocessor to be disabled on usually noise free screen sharing input and other, similar computer generated video frames, thereby increasing the encoding speed. However, some frames of camera captured natural-content videos, with significant levels of picture noise, may be misclassified by the SCC detector as screen content, thereby, for example, causing the consequentially deactivated MCTPF step on these frames to reduce the coding performance.

Aspect 2: Lack of Dependence of RC Method on Level of Input Noise

In VVenC, the rate-QP model used in the two-pass RC scheme [2] employs a corrective second part for high-rate encoding (i.e., with low overall QPs) applying a fixed start QP value, $QP_{start}$, as well as a fixed (for each video resolution) slope constant, $c_{high}$. Since, consequentially, neither $QP_{start}$ nor $c_{high}$ depend on the level of noise present in the input, the frame statistics resulting from the first RC pass, run with relatively high QPs, may differ considerably from the statistics during lower-QP second-pass encoding. This, in turn, may destabilize the RC, causing lower overall encoding efficiency (in terms of, e.g., PSNR) when RC is being used.

Aspect 3: Lack of Recovery from Rate Savings Due to Noise QP Limiting

In [5], a "noise aware" RC method was outlined in which, after having obtained an estimate of the input video's noise level for a group of pictures (GOP), it is enforced that the quantization step size in all coding blocks is large enough to avoid spending a large portion of the bit budget on irrelevant noise components. However, bits saved by this approach are not spent efficiently elsewhere, causing the target rate not to be reached in some cases. The present application proposes improvements to each of the above three aspects to address these problems.

This is achieved by the subject matter of the independent claims of the present application.

Further embodiments according to the invention are defined by the subject matter of the dependent claims of the present application.

SUMMARY OF THE INVENTION

In accordance with a first aspect of the present invention, an apparatus for determining a screen content coding, SCC, indicator for a current frame of a video is provided. The apparatus is configured to determine, for each of positions spatially distributed over the current frame, a dissimilarity measure or a similarity measure of a comparison of a first portion of the current frame at the respective position, and a second portion of a reference frame to which a motion vector of an estimated motion field at the respective position points, form a central value over the dissimilarity measures or similarity measures determined for the positions determine the SCC indicator based on the central value.

In accordance with a second aspect of the present invention, an apparatus for determining a quantization parameter for a second rate-control pass of a video encoder for a group of pictures based on an encoding bitrate and further quantization parameter of a first rate-control pass of the video encoder for the group of pictures is provided. The apparatus is configured to determine, for each of positions spatially distributed over frames of the group of pictures, a dissimilarity measure or a similarity measure of a comparison of a first frame portion at the respective position, and a second portion of a reference frame to which a motion vector of an estimated motion field at the respective position points, form a representative scalar value based on the dissimilarity measures or similarity measures determined for the positions, determine a preliminary quantization parameter for the second rate-control pass based on the encoding bitrate, the further quantization parameter of the first rate-control pass and an intended bitrate for the second rate-control pass, and adjust the preliminary quantization parameter using the representative scalar value to obtain the quantization parameter for a second rate-control pass.

In accordance with a third aspect of the present invention, an apparatus for determining block-related quantization parameters (QP), for a second rate-control pass of a video encoder for a current frame is provided. The apparatus is configured to for each of blocks (e.g. CTUs) into which the current frame is subdivided, determine a preliminary QP value ($QP_{init}$) for a block QP based on first-pass quantization parameter information determined by a first rate-control pass of the video encoder for the respective block (e.g. and based on an encoding bitrate), determine a noise level equivalent QP based on an analysis of sample statistics within the respective block, and correct the block QP by subjecting the preliminary QP value and the noise level equivalent QP to a maximum function, for each of one or more groups (e.g. slices) into which the blocks are grouped, determine a group QP (e.g., $QP_{slice}$) based on the first-pass quantization parameter information, determine a central value ($QP_{avg}$) over the block QP of the blocks within the respective group, and if the central value exceeds the group QP, decrease the block QP of one or more blocks within the respective group.

BRIEF DESCRIPTION OF THE DRAWINGS

The drawings are not necessarily to scale, emphasis instead generally being placed upon illustrating the principles of the invention. In the following description, various embodiments of the invention are described with reference to the following drawings, in which:

FIG. 8 shows a flow diagram for a method for determining a screen content coding, SCC, indicator for a current frame of a video;

FIG. 9 shows a flow diagram for a method for determining a quantization parameter for a second rate-control pass of a video encoder for a group of pictures based on an encoding bitrate and further quantization parameter of a first rate-control pass of the video encoder for the group of pictures; and FIG. 10 shows a flow diagram for a method for determining block-related quantization parameters, QP, for a second rate-control pass of a video encoder for a current frame.

DETAILED DESCRIPTION OF THE EMBODIMENTS

Figure 1:
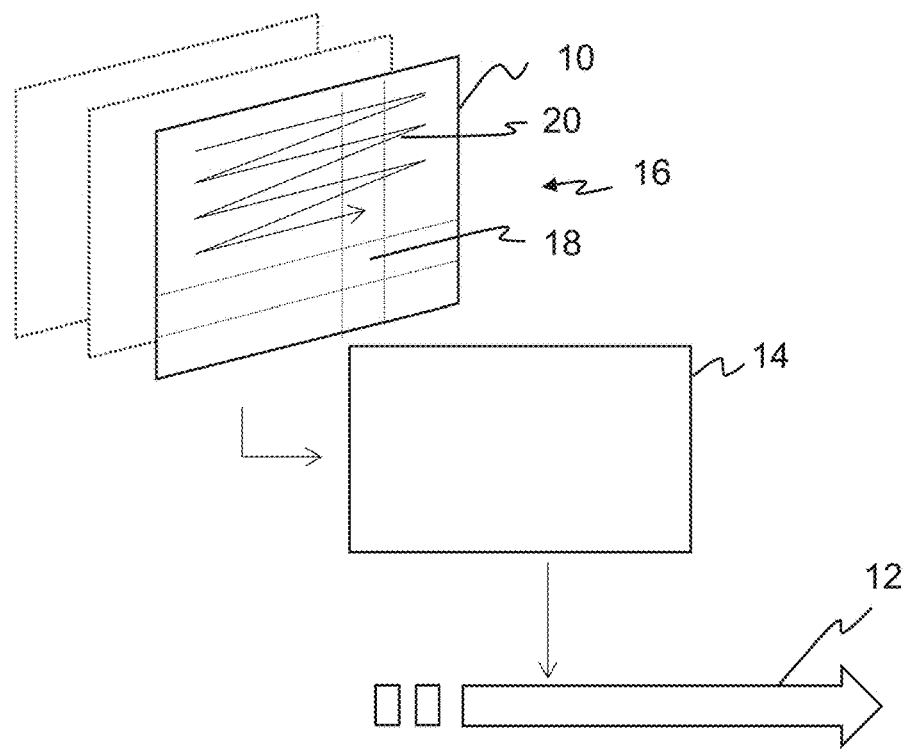
FIG. 1 shows an apparatus for block-wise encoding a picture into a datastream.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present invention. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

In the following, various examples are described which may assist in achieving a more effective compression and an improved encoding performance, e.g., when using rate controlled (RC) encoding and/or input type detection or classification. The RC encoding and/or input type classification may be added to other encoding modes heuristically designed, for instance, or may be provided exclusively. RC encoding may comprise selecting and/or determining encoding parameters in such a way that an encoded datastream has a bitrate that reaches (or comes close to) a target (or intended) bitrate or is (entire or mostly) within a target bitrate range. The target bitrate or target bitrate range may be determined or selected based, for example, on a user bandwidth or a pre-selected bitrate.

In order to ease the understanding of the following examples of the present application, the description starts with a presentation of possible encoders fitting thereto into which the subsequently outlined examples of the present application could be built. FIG. 1 shows an apparatus for block-wise encoding a picture (or frame) 10 into a datastream 12. The apparatus is indicated using reference sign 14 and may be a still picture encoder or a video encoder. In other words, picture 10 may be a current picture out of a video 16 (e.g., comprising one or more pictures 10) when the encoder 14 is configured to encode video 16 including picture 10 into datastream 12, or encoder 14 may encode picture 10 into datastream 12 exclusively.

The apparatus 10 may be or be part of a computing device, such as a computer, one or more servers (e.g., used for cloud computing or cloud storage), a mobile phone, a tablet, a video camera, a video player, a note, a gaming console, a television, or a monitor. The apparatus may comprise circuitry and/or a processor, configured to perform any method disclosed herein (e.g., stored on a non-transitory storage medium).

As mentioned, encoder 14 performs the encoding in a block-wise manner or block-base. To this, encoder 14 subdivides picture 10 into blocks, units of which encoder 14 encodes picture 10 into datastream 12. Generally, the subdivision may end-up into blocks 18 of constant size such as an array of blocks arranged in rows and columns or into blocks 18 of different block sizes such as by use of a hierarchical multi-tree subdivisioning with starting the multi-tree subdivisioning from the whole picture area of picture 10 or from a pre-partitioning of picture 10 into an array of tree blocks wherein these examples shall not be treated as excluding other possible ways of subdivisioning picture 10 into blocks 18. The blocks may have a square shape (e.g., 4×4, 8×8, 16×16, or 32×32 pixels) and/or a rectangular shape (e.g., 4×8, 8×16, or any other ratio between height and width).

Further, encoder 14 is a predictive encoder configured to predictively encode picture 10 into datastream 12. For a certain block 18 this means that encoder 14 determines a prediction signal (or data or bit string) for block 18 and encodes the prediction residual, i.e. the prediction error at which the prediction signal deviates from the actual picture content (e.g., in a spatial or frequency domain) within block 18, into datastream 12.

Encoder 14 may support different prediction modes so as to derive the prediction signal for a certain block 18. The prediction modes comprise intra-prediction modes according to which the inner of block 18 is predicted spatially from neighboring, already encoded samples of picture 10. The encoding of picture 10 into datastream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf notes within a block of a certain hierarchy level may precede blocks of the same hierarchy level having the same parent block according to coding order 20. Depending on the coding order 20, neighboring, already encoded samples of a block 18 may be located usually at one or more sides of block 18. For instance, neighboring, already encoded samples of a block 18 are located to the top of, and to the left of block 18.

Intra-prediction modes may not be the only ones supported by encoder 14. In case of encoder 14 being a video encoder, for instance, encoder 14 may also support intra-prediction modes according to which a block 18 is temporarily predicted from a previously encoded picture of video 16 (e.g., inter-prediction mode). Such an intra-prediction mode may be a motion-compensated prediction mode according to which a motion vector is signaled for such a block 18 indicating a relative spatial offset of the portion from which the prediction signal of block 18 is to be derived as a copy. Additionally or alternatively, other non-intra-prediction modes may be available as well such as inter-view prediction modes in case of encoder 14 being a multi-view encoder, or non-predictive modes according to which the inner of block 18 is coded as is, i.e. without any prediction. Additionally or alternatively, the encoder 14 may be configured to perform inter-layer prediction, e.g., if the encoder 14 supports scalable video coding, e.g., for coding multiple layers with different video quality and/or resolution.

Figure 2:
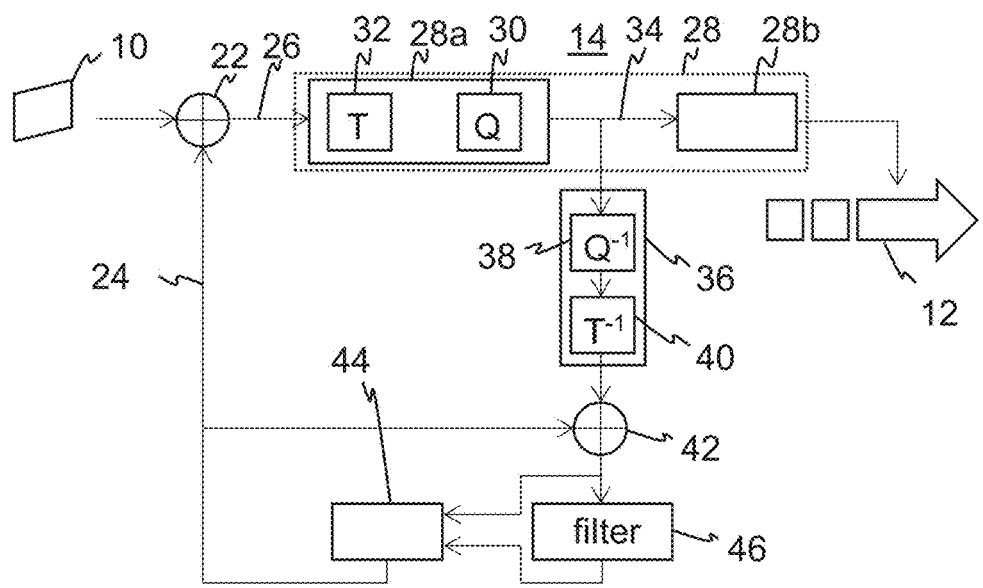
FIG. 2 shows a possible implementation of encoder of FIG. 1.

FIG. 2 shows a possible implementation of encoder 14 of FIG. 1, namely one where the encoder is configured to use transform coding for encoding the prediction residual although this is nearly an example and the present application is not restricted to that sort of prediction residual coding. According to FIG. 2, encoder 14 comprises a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a datastream 12. The prediction residual encoder 28 is composed of a lossy encoding stage 28a and a lossless encoding stage 28b. However, the encoding stage 28a may be lossless and/or the encoding stage 28b may be lossy. The lossy stage 28a receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28a comprises a transform stage 32 connected between subtractor 22 and quantizer 30 so as to transform such a spectrally decomposed prediction residual 26 with a quantization of quantizer 30 taking place on the transformed coefficients where presenting the residual signal 26. The transform may be a DCT, DST, FFT, Hadamard transform or the like. The transformed and quantized prediction residual signal 34 is then subject to lossless coding by the lossless encoding stage 28b which is an entropy coder (e.g., Huffman coding or arithmetic coding) entropy coding quantized prediction residual signal 34 into datastream 12. Encoder 14 further comprises the prediction residual signal reconstruction stage 36 connected to the output of quantizer 30 so as to reconstruct from the transformed and quantized prediction residual signal 34 the prediction residual signal in a manner also available at a decoder, i.e. taking the coding loss is quantizer 30 into account. To this end, the prediction residual reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. Encoder 14 comprises an adder 42 which adds the reconstructed prediction residual signal as output by inverse transformer 40 and the prediction signal 24 so as to output a reconstructed signal, i.e. reconstructed samples. This output is fed into a predictor 44 of encoder 14 which then determines the prediction signal 24 based thereon. It is predictor 44 which supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

It is noted that the encoder 10 is only an example for an encoder which may be compatible with the apparatus and method disclosed herein. The encoder 10 may comprise less features, alternative features, and/or additional features. The encoder 10 (or any alternative thereof) may, for example, realize any apparatus and/or be configured to perform any method disclosed herein. The encoder 10 may be combined with any apparatus disclosed herein. In such a case, the encoder 10 and the apparatus may be configured to communicate one or more parameter. The one or more parameter may include at least one of an SCC indicator (and/or one or more parameters that allows determining the SCC indicator such as a dissimilarity/similarity measure, a central value, a further dissimilarity/similarity measure, a threshold, or any other parameter disclosed with reference to aspect 1), adjusted preliminary quantization parameter (and/or one or more parameters used for the adjustment such as spatially distributed positions, a comparison, a motion vector, a representative scalar value, a preliminary quantization parameter, a further quantization parameter, or any other parameter disclosed with reference to aspect 2), and a decreased block QP (and/or one or more parameters used for decreasing the block QP such as a central value, a group QP, a corrected block QP, a noise level equivalent QP, a preliminary QP value, or any other parameter disclosed with reference to aspect 3). The apparatus may comprise an encoder (e.g., encoder 10). The encoder (e.g., encoder 10) may comprise the apparatus.

It is further noted that an apparatus may comprise features of only one aspect (e.g., only of aspect 1, 2, or 3) or may comprise features of more than one aspect (e.g., two aspects or all three aspects). Furthermore an apparatus may comprise features of any aspect in any combination. The apparatus may comprise only parts of another aspect (e.g., aspect 1, which is also configured to perform one or more method steps of aspect 2 and/or 3). The apparatus may be configured to use a feature common for two different aspects (e.g., the apparatus may be configured to determine an estimated motion field and use a result thereof for one or more of the aspects 1 to 3).

As already mentioned above, encoder 14 operates block-based. For the subsequent description, the block bases of interest is the one subdividing picture 10 into blocks for which the intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, it is decided as to which supported intra-prediction mode (or which combination of prediction modes, e.g., a combination of at least one of intra-prediction, inter-prediction, inter-layer prediction, and inter-view-prediction) should be used for the respective prediction block. These prediction blocks will form blocks 18 which are of interest here. Prediction blocks within coding blocks associated with inter-prediction would be treated differently by predictor 44. They would be inter-predicted from reference pictures (e.g., temporally before or after the picture 10 within a video sequence of pictures) by determining a motion vector and copying the prediction signal for this block from a location in the reference picture pointed to by the motion vector. Another block subdivisioning pertains the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning (e.g., quadtree divisioning, or any other form of dividing a coding block), and prediction blocks and/or transform blocks may be obtained by further subdividing coding blocks using multi-tree subdivisioning, as well.

The present invention proposes three aspects to improve encoding:
1. Reactivation of MCTPF on noisy frames initially classified as SCC
2. Introduction of dependence of RC method on level of input noise
3. Allowing recovery from rate savings due to noise level QP limiting Each of these aspects will be described, using figures where appropriate, in a separate subsection hereafter. As already discussed above, each of the three aspects can be realized in isolation from the other aspects and can provide corresponding technical effects. However, any technical teaching of two or more aspects (in its entirety or parts thereof) may be combined.

Aspect 1: Reactivation of MCTPF on Noisy Frames Initially Classified as SCC

Although, as in VVenC, the SCC classifier may operate before the MCTPF processor during video encoding, it is feasible to re-evaluate the SCC classification result, for example, for each frame at index f (and optionally at a portion of a frame such as a slice thereof), for example once noise indicative information have been obtained, for example, at least motion estimation (ME) calculations that may be required for MCTPF have been performed. The reason is that actual encoding decisions, e.g., in the encoder's rate-distortion (RD) optimization loop, may be made only after all f in a group of pictures (GOP) to be encoded have been subjected to MCTPF application which, as stated, may require a corresponding ME analysis.

Figure 3A:
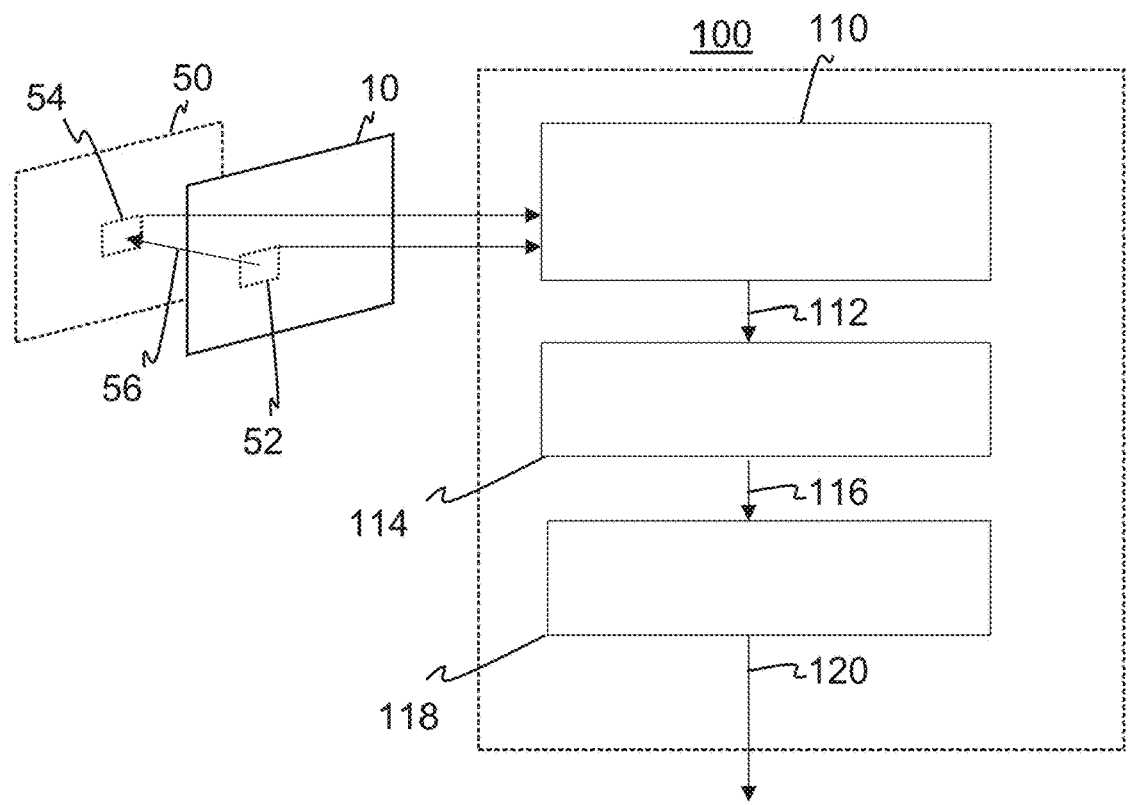
FIG. 3A shows a schematic diagram of an example of an apparatus for determining a screen content coding, SCC, indicator for a current frame of a video.

FIG. 3A shows a schematic diagram of an example of an apparatus 100 for determining a screen content coding, SCC, indicator for a current frame 10 of a video. As already discussed above, the apparatus 100 may comprise or be part of an encoder or part of a system comprising an encoder. For example, a system may be provided that comprises the apparatus 100 and an encoder, e.g., which may be configured to encode at least a current frame of a video using an SCC indicator of the apparatus 100.

The apparatus 100 is configured to determine, e.g., using dissimilarity or similarity measure determination means 110, for each of positions spatially distributed over the current frame 10, a dissimilarity measure or a similarity measure 112 of a comparison of a first portion 52 of the current frame 10 at the respective position, and a second portion 54 of a reference frame 50 to which a motion vector 56 of an estimated motion field at the respective position points. The apparatus 100 is further configured to form, e.g., using central value formation means 114, a central value 116 over the dissimilarity measures or similarity measures 112 determined for the positions 52, 54. The apparatus is configured to determine, e.g., by using an SSC indicator determiner 118, the SCC indicator 120 based on the central value 116. The SCC indicator 120 may be a binary flag.

At least one of the dissimilarity or similarity measure determination means 110, central value formation means 114, and SSC indicator determiner 118 may be provided as a part of or a functionality of a circuit, integrated circuit, or a computer program product (e.g., stored on a non-transitory storage medium). Any feature or function for determining the dissimilarity or similarity measure described in aspect 1 may be used in aspect 2 and 3. Vice versa, any feature or function for determining the dissimilarity or similarity measure described in aspects 2 and 3 may be used in any of the aspects 1, 2, and 3.

The first portion 52 may be a (e.g., rectangular or square) block, such as a group of coding tree units (CTU), a (single) CTU or a subdivision thereof (e.g., a coding tree block or a coding unit). The second portion 54 may be a block of the same size (e.g., size width and height) or of a different size (e.g., scalable from a different layer such as from a base layer). The reference frame 50 may be a frame temporally before or after the current frame 10 in a frame sequence of the video. The reference frame may be a preceding frame in a coding order. The reference frame may be a from a same or different layer for scalable video coding. The estimated motion field may comprise a motion vector for every portion (e.g., block) of the frame or only a part thereof (e.g., one or more slices). The estimation motion field may be determined by based on minimizing a dissimilarity (or maximizing a similarity) between each first portion 52 and a set of potential second portions of the reference frame.

For example, the current frame 10 may have a width of 1280 pixels and a height of 720 pixels and be divided into 80×45=3600 first portions 52 formed by 16×16 pixel blocks, wherein the estimated motion field comprises 3600 motion vectors for pointing from each one of the first portions 52 to (e.g., geometrically translating towards) corresponding second portions of a reference frame. However, any other parameters for the current frame 10, the first portions 52, and the estimated motion field may be defined. A motion vector may define a translation within a pixel coordinate system of the current frame 10. The spatially distributed positions may indicate a reference position of a first portion 52 relative to the first frame 50. For example, the reference position may be arranged at a corner or center of the first portion 52 (e.g., a top left pixel or any other pixel of a block).

The similarity measure or similarity measure 112 may indicate a similarity or a deviation between (e.g., one, more than one, or all) sample values of the first portion 52 and the second portion 54. The sample values may include at least one of a lumen value, one or more chroma values, a depth value). The sample values may be defined in a frequency domain and/or image domain. For example, the similarity measure or similarity measure 112 may be determined based on differences of luma values for each (or only some) pixel of the first portion and the second portion 52. For example, first portion 52 and the second portion 54 may each define a 16×16 block, wherein 256 luma differences between the pixels of the first and second portion 52, 54 are determined. The similarity measure or similarity measure 112 may be determined based on a (e.g., absolute or squared) deviation of sample value differences from a central measure (e.g., average, arithmetic mean, or median) of the sample value difference. The similarity measure or similarity measure 112 may be determined based on a variance (e.g., based on a squared or absolute deviation) of the sample values. The central value is formed over the dissimilarity measures or similarity measures 112 determined for the positions (or the first portions located at said positions), wherein the central value may be (or may be based on) an arithmetic mean, a geometric mean, or root mean square of the dissimilarity measures or similarity measures 12 determined for the positions 52, 54.

Using the (non-limiting) example of a 1280×720 frame 10 comprising 3600 first regions 52 formed by 16×16 pixel blocks, for each first region 52 a dissimilarity measure or similarity measure 112 may be determined based on or as a variance of differences of sample values (e.g., luma values) between the first and second region 52. For example, for each first region 52, 16×16=256 differences of sample values are determined, wherein the dissimilarity measure or similarity measure 112 is based on or formed by a variance (e.g., a squared or absolute difference relative to an average of) the 256 differences of sample values. As a result, 3600 (i.e. one for each first region 52) dissimilarity measure or similarity measure 112 may be determined. The central value may, for example, be formed as (or based on) an arithmetic mean (or any other central value) of said 3600 dissimilarity measures or similarity measures 112.

A larger dissimilarity (or smaller similarity) between the first and second portions 52, 54 may result in larger differences and therefore a larger deviation. Vice versa, a smaller dissimilarity (or larger similarity) between the first and second portions 52, 54 may result in smaller differences and therefore a smaller deviation. Therefore, a smaller variance of the sample values may indicate more similarity (or less dissimilarity) between the first and second portions 52, 54. A frame 10 that contains more noise (e.g., due to a camera captured scene) may result in a larger measure of dissimilarity (or smaller measure of similarity) and therefore larger central value than for a frame 10 with less noise. Therefore, the central value can be indicative about a screen content and can be used as a basis for determining the SCC indicator 120.

The central value 116 may be an arithmetic mean, a geometric mean, or root mean square of the dissimilarity measures or similarity measures determined for the positions 52, 54.

The apparatus may be configured to determine the SCC indicator 120 based on a comparison of the central value 116 with a threshold. The threshold may be defined by at least one of a predetermined value between 0 and 100; and on a coding bit depth of the frame 10, wherein, as an option, the threshold has different values for a sample bit depth of eight bit and a ten bit.

For example, it has been found that a central value 116 determined based on a variance of luma differences (e.g., an arithmetic mean of variances of squared deviances of luma differences) may have values between 0 and 100. Such a central value 116 may therefore be compared to a threshold having a (e.g., pre-determined) value between 0 and 100. However, the threshold value may be adjusted based on one or more parameters such as coding bit depth and the scheme of determining the central value 116. For example, a coding bit depth of 10 allows sample values to assume more values or have more values than a coding bit depth of 8. As a result, the threshold value may be adjusted (e.g., to a larger or smaller value) according to the coding bit depth. In another example, a central value 116 determined based on an arithmetic mean may be larger than a central value 116 determined based on a geometric mean. Furthermore, an absolute deviance of sample value differences may be smaller than a squared deviance. Therefore, the value for the threshold may be adjusted (e.g., scaled up or down) according to the scheme that is used for determining the central value 116.

The SCC indicator 120 may be defined by a binary parameter such as a binary flag. For example, the binary flag may assume a first state (e.g., "1"), which may indicate that the current frame 10 contains (or likely contains) screen content or that the current frame 10 contains screen-content-level noise or that the current frame 10 does not require filtering (e.g., temporal pre-filtering, e.g., motion compensated temporal pre-filtering). Vice versa, the binary flag may assume a second state (e.g., "0"), which may indicate that the current frame 10 does not contain (or likely does not contain) screen content or that the current frame 10 does not contain screen-content-level noise or that the current frame 10 may require filtering (e.g., temporal pre-filtering, e.g., motion compensated temporal pre-filtering). The binary flag may assume the first or second state depending on the comparison with the threshold. For example, the binary flag may assume the first state (i.e. screen content is at least likely) if the central value 116 is smaller than (or smaller than or equal to) the threshold and the second state (i.e. screen content is at least unlikely) if the central value 116 is greater than or equal to (or greater than) the threshold.

Alternatively, the SCC indicator 120 may assume more than two values (e.g., three, four, five or more values). For example, multiple thresholds may be provided (e.g., one less values than the SCC indicator 120 can assume) and the SCC indicator 120 assumes a value according to a comparison of the central value 116 compared to one or more of the thresholds (e.g., the central value 116 being smaller or greater than all thresholds or being within two thresholds). Additionally or alternatively, the SCC indicator 120 may be determined based on a functional relationship between the central value 116 and the SCC indicator 120.

The apparatus 100 may be configured is to determine the SCC indicator 120 only for a plurality of frames that have the same or a lower temporal level. For example, the apparatus 100 may be configured to determine the SCC indicator 120 for key frames (e.g., I-frames) or frames for the lowest one, two, or three temporal levels. For example, the apparatus 100 may be configured to determine the SCC indicator 120 for a first set of frames in a coding order of frames (which may be different compared to a video sequence of frames). The apparatus 100 may be configured to determine the central value for individual frame (e.g., current frame 10) or a combination of frames (or group of pictures). For example, the apparatus 100 may be configured to determine a central value of the combination of frames based on a central value (e.g., arithmetic or geometric mean) over central values determined for individual frames. In another example, the apparatus may be configured to determine a central value of the combination of frames based on a central value (e.g., arithmetic or geometric mean) over dissimilarity measures or similarity measures determined for positions of the combination of frames.

Figure 3B:
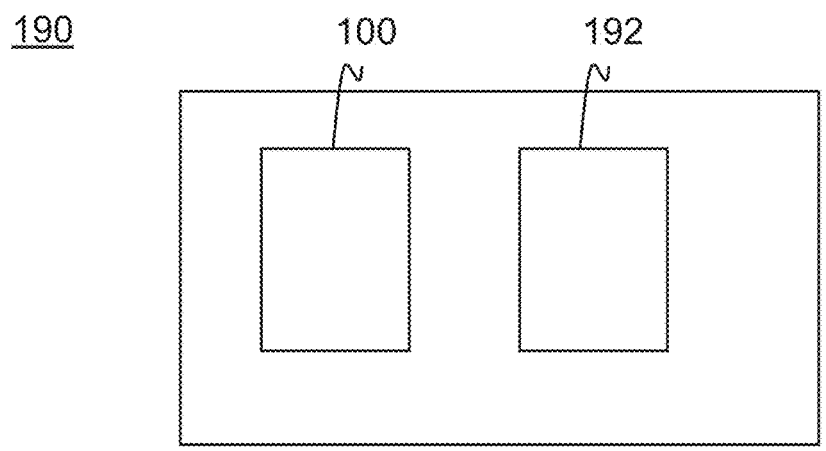
FIG. 3B shows a schematic view of a system for encoding a video.

FIG. 3B shows a schematic view of a system 190 for encoding a video, comprising an apparatus 100 for determining an SCC indicator at least for a current frame of the video as described herein, and an encoder 192 configured to encode at least the current frame of the video using the SCC indicator 120. The system 190 (or the encoder 192 or the apparatus 100, e.g., if it comprises the encoder 192) may be configured to perform any method or comprise any functionality disclosed herein with reference to the apparatus 100.

The system 190 may be configured to determine whether the frame 50 contains screen content based on the SCC indicator and optionally based one or more further SCC indicators. The system 190 may be configured to validate one or more further SCC indicators based on the SCC indicator. The system 190 may be configured to perform filtering (e.g., temporal pre-filtering, e.g., motion compensated temporal pre-filtering) based on the SCC indicator or based on determining whether the frame 50 contains screen content or based on a validation of one or more further SCC indicators (using the SCC indicator).

The apparatus 100 (or the system 190) may comprise a motion estimator configured to determine the estimated motion field by, for each of the positions spatially distributed over the current frame 10, determining, for each of a plurality of candidate motion vectors, a further dissimilarity measure or a further similarity measure of a comparison of the first portion of the current frame at the respective position, and a further second portion of a reference frame to which the respective candidate motion vector points, and appointing, based on an analysis of the further dissimilarity measure or the further similarity measure determined for the plurality of candidate motion vectors, a predetermined motion vector out of the plurality of candidate motion vectors the motion vector of the estimated motion field at the respective position, wherein the apparatus 100 (or the system 190) is configured to, for each position, use the further dissimilarity measure or the further similarity measure determined for the predetermined motion vector as the dissimilarity measure or the similarity measure, or the minimum among the further dissimilarity measure or the maximum among the further similarity measure determined for the candidate motion vectors. In other words, the apparatus 100 may be configured to determine the estimated motion field that is used for determining the dissimilarity measure or a similarity measure 112. In such a case, the further dissimilarity measure or the further similarity measure may be identical to or similar to the dissimilarity measure or the similarity measure, as it also based on a comparison for the first and second portions 52, 54. Therefore, the further dissimilarity measure or the further similarity measure (or a minimum thereof, e.g., in case of multiple measures), may substitute the dissimilarity measure or a similarity measure 112 for determining the SCC indicator 120. Alternatively, a component different from the apparatus (e.g., the encoder 192 or another dedicated component) may comprise the motion estimator and may be configured to transmit (or send or communicate) to the apparatus 100 at least one of the further dissimilarity measure or the further similarity measure and the estimated motion field.

The estimated motion field may be determined in an analysis step for motion compensated temporal pre-filtering (MCTPF). The apparatus 190 may be configured to perform or suppress (or skip) the motion compensated temporal pre-filtering based of the SCC indicator.

It is worth noting that MCTPF's analysis step may yield block-wise (e.g., for each first portion 52) minimum ME error information (MMEE) (e.g., the dissimilarity measure or a similarity measure), which can be exploited to estimate, using e.g. a minimum statistics approach [5, 6], a noise level L (e.g., the central value 116) for each GOP (e.g., combination of frames), or at least for each individual frame f (e.g., current frame 10) in the GOP. Comparing this level L to some constant threshold T, a final decision can then be made as to whether a previous "strong SCC" classification is being confirmed and frame f is still regarded "strong SCC"—in which case the MCTPF processing is being bypassed—or whether a previous "strong SCC" classification is being revoked and f is now considered "weak SCC"—in which case MCTPF is being applied. It is noted that the above explanation serves as an example application. However, the aspect is not limited to MMEE or a filter in form of MCTPF.

The SCC indicator may improve decision making that depends on screen content. For example, the SCC indicator may be used to decide whether to apply filtering, which can reduce the risk of redundant filtering or incorrectly skipped filtering. Therefore, the coding process can be realized more efficiently and coding quality may be improved.

Example Embodiment

The above-mentioned final "L vs. T" decision is, preferably, made to enforce MCTPF when needed. An exemplary embodiment (e.g., of a method or an apparatus configured to perform the method) may, therefore, be as follows where, for reasons of simplicity, the focus is on frame-wise operation:

Step 1: For each frame f (e.g., current frame 10), calculate (e.g., determine), from block-wise MMEE information (e.g., a dissimilarity measure or a similarity measure of a first portion 52) determined during an MCTPF analysis stage (e.g., based on an estimated motion field, e.g., determined by a motion estimator), an overall MMEE value $L_f$ (e.g., central value 116) for f, preferably by calculating the mean or square mean root (SMR) of all MMEE data in frame f. Said mean may be the arithmetic (preferred) or geometric (alternative) mean. In other words, the method may comprise determining, for each of positions spatially distributed over the current frame 10, a dissimilarity measure or a similarity measure 112 of a comparison of a first portion 52 of the current frame 10 at the respective position, and a second portion 54 of a reference frame 50 to which a motion vector 56 of an estimated motion field at the respective position points 52, 54, wherein the dissimilarity measure or a similarity measure 112 is determined based on minimum motion estimation error information (MMEE) information and the central value 116 (e.g., Lt) is determined based on an arithmetic or geometric mean of the dissimilarity measure or a similarity measure 112 determined for the first portions 52 (e.g., all first portions 52) of the current frame 10.

Step 2: If, for a given f (e.g., current frame 10), the SCC detector (e.g., apparatus 100, system 100, encoder 192 or a different component) classified f as containing "screen content" (e.g., based on a further SCC indicator, which may be different from the central value 116), compare $L_f$ (e.g., central value 116) against the predefined threshold T, where 0<T<100 for 8-bit or 10-bit video (e.g., for verifying the further SCC indicator). If $L_f$>T, then subject frame f to motion compensated temporal pre-filtering; otherwise (i.e., $L_f \leq$ T), don't subject f to such temporal pre-filtering. In other words, the method may comprise determining an SCC indicator based on a comparison of the central value 116 with the threshold T. The SCC indicator may be the comparison (e.g., whether the comparison is true, e.g., whether $L_f \leq$T is true, e.g., whether a difference Lt-T or T-Li is negative) or a parameter (e.g., a binary flag) set to a value (e.g., a first or second state, or one of many states) dependent on the comparison.

Step 3: (optional) Apply steps 1 and 2 only to those frames f (e.g., current frame 10) belonging to a certain temporal level of a GOP (and optionally lower temporal level). For example, in random access (RA) encoding, apply steps 1 and 2 only to key frames, having a minimum temporal level.

The "L vs. T" comparison in step 2 basically answers the question: does f exhibit a significant noise level?

Since, as noted in the description of aspect 1, the estimation of noise level L is, preferably, performed using a minimum statistics approach, a one may conclude that taking the minimum, instead of the mean or SMR, of the MMEE data in step 1 of aspect 1 may improve the $L_f$ estimation performance. However, it was observed that this approach may be less reliable especially with very dark video material or cinematic videos containing black borders at the top and bottom (which, by design, typically do not contain any picture noise).

Aspect 2: Introduction of Dependence of RC Method on Level of Input Noise

Figure 4A:
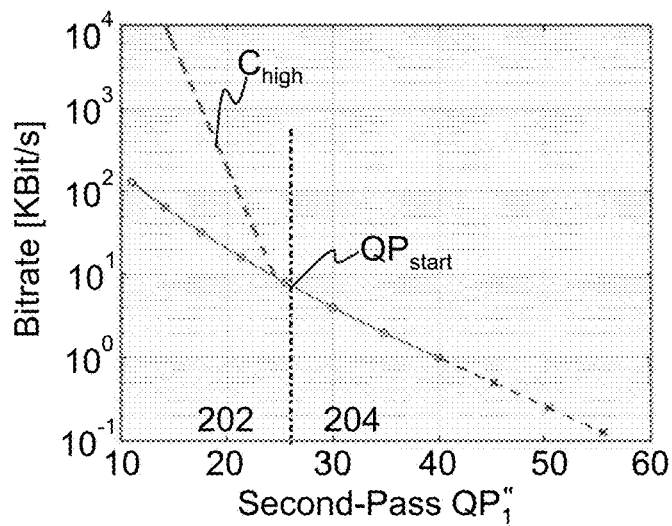
FIG. 4A shows an example of a rate-quantization-parameter function for two pass control with different first pass quantization parameters.

FIG. 4A shows an example of a rate-quantization-parameter function for two pass control with different first pass quantization parameters. The rate-rate-quantization-parameter function spans over a first QP range 202 and a second QP range 204. The first and second QP ranges 202, 204 are separated at a $QP_{start}$ of 24. In the first QP range 202, the rate-rate-quantization-parameter has a slope of 0.75 towards lower QP (e.g., a slope in the first QP range 202 is more negative towards positive QP than in the second QP range). The dashed line in the first QP range 202 indicates a correction of the rate-quantization-parameter function.

In [2], a two-pass rate control (RC) scheme was proposed which, effectively, models the rate-QP (R-QP) relationship by a two part linear function on a logarithmic scale. That two-part log-linear function, illustrated in FIG. 4a, increases in steepness towards lower QPs (i.e., exhibits faster rate increase towards high rates than low rates, e.g. exhibits faster rate increase towards low QP than high QP) in the first QP range 202, as is the case in most natural camera captured content. The slope (as controlled by parameter $c_{high}$) and offset (as controlled by a parameter $QP_{start}$) of the R-QP function of the example shown in FIG. 4A is fixed.

Figure 4B:
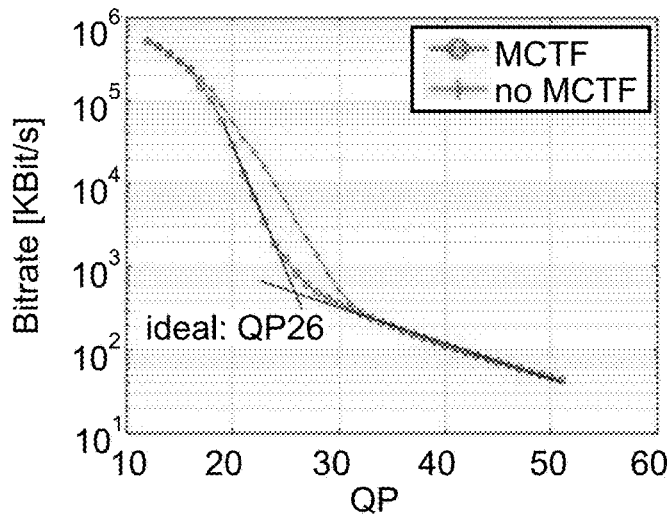
FIG. 4B shows another example of a rate-quantization-parameter function for two pass control with different first pass quantization parameters.

FIG. 4B shows another example of a rate-quantization-parameter function for two pass control with different first pass quantization parameters.

Figure 4C:
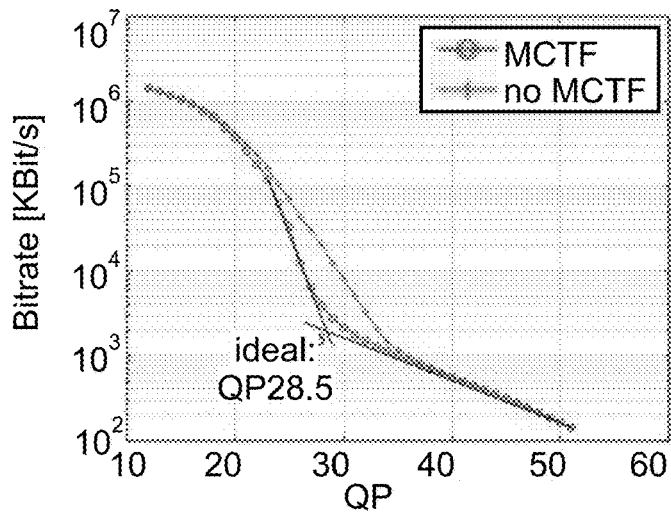
FIG. 4C shows another example of a rate-quantization-parameter function for two pass control with different first pass quantization parameters.

FIG. 4C shows another example of a rate-quantization-parameter function for two pass control with different first pass quantization parameters.

However, the rate-quantization-parameter functions depicted in FIG. 4b, c indicate that they may vary significantly with the actual video input. Since an improper function configuration may, as noted earlier, destabilize the RC, an input dependent approach, varying, for example, $QP_{start}$ based on the video, is described.

Figure 5:
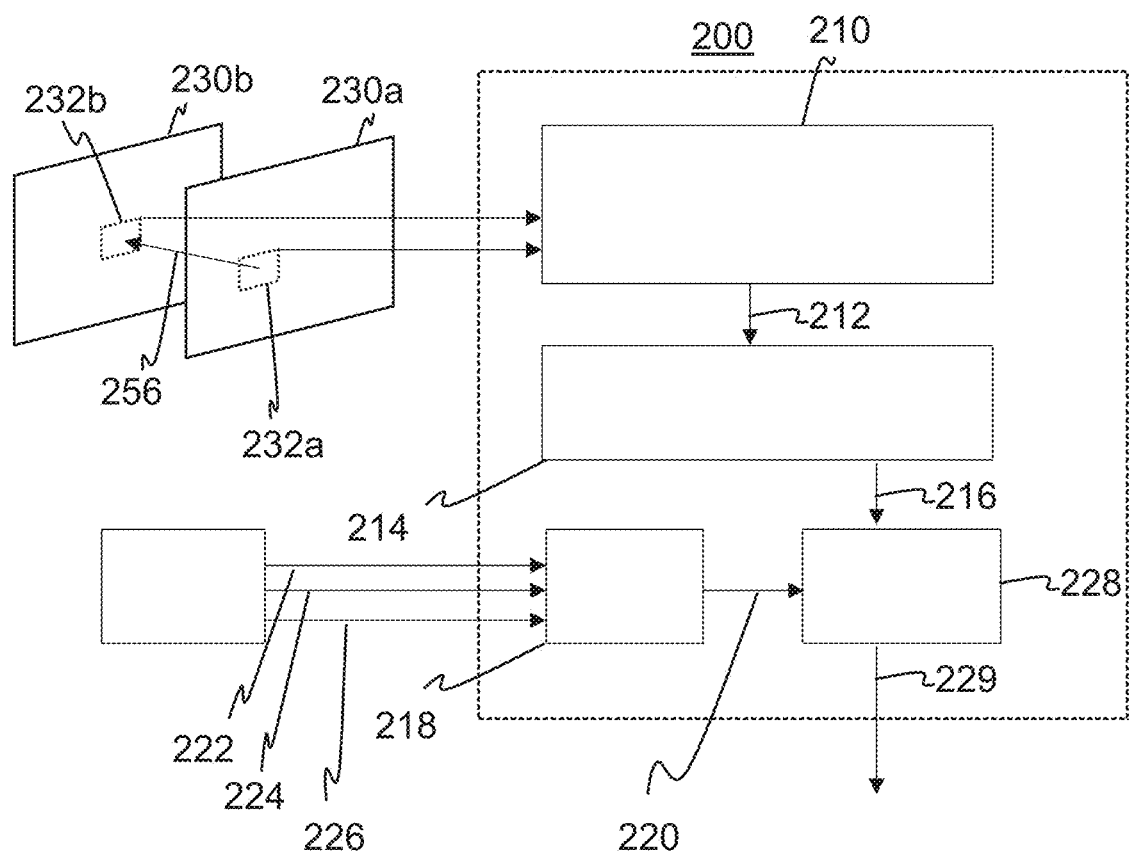
FIG. 5 shows a schematic diagram of an example of an apparatus for determining a quantization parameter for a second rate-control pass of a video encoder.

FIG. 5 shows a schematic diagram of an example of an apparatus 200 for determining a quantization parameter for a second rate-control pass of a video encoder for a group of pictures (GOP) based on an encoding bitrate and further quantization parameter of a first rate-control pass of the video encoder for the group of pictures. The apparatus 200 may be configured to comprise any structure or functionality of the apparatus of the first aspect (E.g., apparatus 100) described above. Alternatively, the apparatus 200 may not be configured as apparatus 100 or may comprise or be coupled with apparatus 100.

The further quantization parameter may be a pre-determined quantization parameter and the encoding bitrate (e.g., bits/s) of the first rate-control pass may be the result (e.g., not pre-determined) of encoding the group of pictures with the pre-determined further quantization parameter. The second rate-control pass may be performed (e.g., by the encoder) at or close to a target bit rate or at a bitrate entirely or mostly within a bit rate target range.

The apparatus 200 is configured to determine, e.g. using dissimilarity measure or a similarity measure determination mean 210, for each of positions spatially distributed over frames 230a, b of the group of pictures (e.g., group of frames), a dissimilarity measure or a similarity measure 212 of a comparison of a first frame portion 232a at the respective position (e.g., of frame 230a), and a second portion 232b of a reference frame 230b to which a motion vector 256 of an estimated motion field at the respective position points. The apparatus is further configured to form, e.g., using representative scalar value formation means 214, a representative scalar value 216 based on the dissimilarity measures or similarity measures 212 determined for the positions. The representative scalar value 216 may be determined as or on a basis of a minimum of frame wise measures, wherein the frame wise measure of a respective frame may be determined as or on a basis of an average (e.g., an arithmetic mean or geometric mean or any other mean) of dissimilarity measures or similarity measures 212 of the respective frame.

The apparatus 200 may be configured to determine the dissimilarity measure or a similarity measure 212 in any way as described above in aspect 1 (e.g., similarity measure or similarity measure 112). For example, the first and second portions 232a, b, the frames 232a, b, the frame wise measures may be processed (e.g., determined, formed, adjusted, calculated) in the same or similar way as described above in aspect 1.

For example, one or more (or all) of the frame wise measures according to aspect 2 may be determined as central value (as described according to aspect 1).

In a non-limiting example, a group of sixteen frames 230 is provided that form (or are included in) the group of pictures, wherein each frame 230 has a resolution of 1280× 720 pixels and is divided into 3600 first frame portions 232a. For each first frame portion 232a, a dissimilarity measure or a similarity measure 212 may be determined based on or formed by a variance (e.g., a squared or absolute difference relative to an average of) a 256 differences of sample values between the first frame portion 232a and a second frame portion 232b of a reference frame. For each frame, the frame wise measure may be determined (or may be based on) an arithmetic mean, a geometric mean, or root mean square of the dissimilarity measures or similarity measures 212 of the respective frame. In such an example, the group of pictures (having sixteen frames 230) may have a total of sixteen frame wise measures. The representative scalar value may be determined as a minimum of the sixteen frame wise measures. However, the parameters of the example may be selected differently. For example, the number of frames 230, the size of the frames, the size of the first frame portions 232a may be different. Furthermore, the algorithms for determining parameters such as the dissimilarity measure or a similarity measure 212, the frames wise measure and the representative scalar value may be different.

For example, the representative scalar value 216 may be determined without determining a frame wise measure. For example, the representative scalar value 216 may be determined based on a mean (e.g., arithmetic or geometric or any other form) of all (or some of the) dissimilarity measures or similarity measures 212 from the frames 230.

In another example, a frame subset measure may be determined based on the dissimilarity measures or similarity measures 212 of a subset of the group of frames 230 (e.g., four out of sixteen frames). The frame subset measure may be determined based on a mean of all the dissimilarity measures or similarity measures 212 of the subset of the group of frames 230. The representative scalar value 216 may be determined as or based on a minimum of the frame subset measures.

The apparatus 200 is configured to determine, e.g., using preliminary quantization parameter determination means 218, a preliminary quantization parameter 220 for the second rate-control pass based on the encoding bitrate 222, the further quantization parameter 225 of the first rate-control pass and an intended bitrate 226 (or target bitrate) for the second rate-control pass. The apparatus 200 may be configured to the receive the encoding bitrate 222, the further quantization parameter 225 of the first rate-control pass and an intended bitrate 226 for the second rate-control pass from an external component (as exemplarily depicted in FIG. 5) such as an encoder. Alternatively, at apparatus 200 may be configured to determine at least one of the encoding bitrate 222, the further quantization parameter 225 of the first rate-control pass and an intended bitrate 226 for the second rate-control pass.

The preliminary quantization parameter 220 may be scaled version of the further quantization parameter, e.g., scaled proportional to (or based on) a ratio determined between a target bit rate and the further bit rate. The intended bitrate 226 may be determined or selected based on at least one of an network capabilities (e.g., of a user or server) or pre-determined values (e.g., for a selection of video qualities on an online video platform).

The apparatus 200 is configured to adjust, e.g., using preliminary quantization parameter adjusting means 228, the preliminary quantization parameter 220 using the representative scalar value 216 to obtain the quantization parameter for a second rate-control pass 229. The representative value 216 may be obtained by forming a central value (e.g. average, e.g., arithmetic mean or geometric mean) frame wise and by determining a minimum (or median or mean) of the central values.

At least one of the dissimilarity measure or a similarity measure determination mean 210, representative scalar value formation means 214, preliminary quantization parameter determination means 218, and second rate-control pass 229 may be provided as a part of or a functionality of a circuit, integrated circuit, or a computer program product (e.g., stored on a non-transitory storage medium).

Adjusting the preliminary quantization parameter (220) may be based on a binary logarithm (or a logarithm with a different base) of the representative scalar value (or a rescaled version thereof, e.g., if based on a linear-value domain) (and optionally based on a negative offset).

A threshold quantization parameter $QP_{start}$ as an upper limit for the preliminary quantization parameters to be adjusted may be determined based on the following formula:

$$QP_{start} = \text{round}(3 \cdot \log_2(resRatio \cdot L_g) + \beta) \quad \text{equation (1)}$$

with the representative scalar value $L_G$ (e.g., representative scalar value 216) and a predetermined scaling factor resRatio (e.g., resRatio=$\sqrt{(w \cdot h)/(3840 \cdot 2160)}$ with a frame width w and a frame height h), which is smaller than or equal to one and dependent either on a coding bit depth or a frame resolution, and $\beta$ is a predetermined negative value (wherein $\beta$ has a larger absolute value if a motion compensated temporal pre-filtering was applied and a smaller absolute value if no motion compensated temporal pre-filtering was applied). For example, with a frame of 1920×1080 a predetermined scaling factor resRatio may be determined as ResRatio=sqrt((1920·1080)/(3840·2160))=0.5. The round( )-function may be a function for rounding down, rounding up, rounding towards zero, or rounding to the nearest integer. The scaling factor resRatio may alternatively or additionally depend on a coding bit depth. For example, the scaling factor resRatio may be smaller (or scaled smaller) for a bit depth of 8-bit than for a bit depth of 10-bit.

It is noted that the logarithm in equation (1) is multiplied with a factor of three. It has been found that a scaling factor of three provides an improved adjusted. However, any other scaling factor may be used (e.g., between 1 and 5, e.g., between 2.5 and 3.5).

The representative scalar value 216 (or $L_G$) (and optionally the threshold quantization parameter $QP_{start}$ and/or adjusted preliminary quantization parameter determined therefrom) may be used for one, more than or reach frame of the group of frames (or group of pictures). For example, the representative scalar value 216 (and optionally the threshold quantization parameter $QP_{start}$ and/or adjusted preliminary quantization parameter determined therefrom) may be determined from a first group pictures and used for encoding (or as a basis for further adjustment, e.g., according to aspect 3) of each frame of the first group of pictures. Optionally, a further representative scalar value 216 may be determined for a second (e.g., subsequent) group of pictures and used for encoding (or as a basis for further adjustment) each frame of the second group of pictures.

Alternatively, the representative scalar value 216 (and optionally the threshold quantization parameter $QP_{start}$ and/or adjusted preliminary quantization parameter determined therefrom) may be determined (newly) for each frame, based on a group of pictures dependent on the frame. For example, the group of pictures may be selected (or determined) based on a pre-determined number of frames relative to a current frame. For example, the group of pictures may be selected a pre-determined number of frames before and/or after the current frame (e.g., including the current frame). For example, the group of pictures may be selected as the current frame and pre-determined number (e.g., three, five, or seven) of frames (e.g., in a coding order or video sequence order).

If the threshold quantization parameter $QP_{start}$ is determined to be negative, the threshold quantization parameter may be set to zero instead.

The adjusted preliminary quantization parameter 220 may be defined by two linear relationships between the quantization parameter and a logarithm of the encoding bitrate (e.g., on a semi-logarithmic plot with the encoding bitrate on the logarithmic scale) that meet at the threshold quantization parameter $QP_{start}$ wherein the linear relationship QP'f above the threshold quantization parameter $QP_{start}$ is defined by the following formula:

$$QP'_f = QP_f - c_{low} \cdot \sqrt{\max(1; QP_f)} \cdot \log_2\left(\frac{r'_f}{r_f}\right), \quad \text{equation (2)}$$

with a predetermined slope $c_{low}$ (e.g., $c_{low}$=0.82, or any other value between 0 and 1, e.g., between 0.6 and 0.9), a quantization parameter of the first rate-control pass $QP_f$, a bit rate of the first rate-control pass $r_f$, and a intended bit rate (or target bit rate) of the second rate-control pass $r'_f$, and wherein the linear relationship $QP''_f$ below the threshold quantization parameter $QP_{start}$ is defined by the following formula:

$$QP''_f = \text{round}(QP'_f + c_{high} \cdot \max(0; QP_{start} - QP'_f)) \quad \text{equation (3)}$$

with a predetermined slope $c_{high}$. (which may be between 0 and 1, e.g., 0.5)

Example Embodiment

The above-mentioned dependence of the bitrate-quantization-parameter (R-QP) model on the input video is, for example, realized by considering the input noise level L (e.g., representative scalar value 216), estimated across multiple frames f (e.g. a group of frames or pictures, e.g., a group of frames). An exemplary embodiment may, thus, look as follows:

Step 1: For each frame f (e.g., frame 230a, b) associated with a given GOP, calculate, from block-wise MMEE information (e.g., dissimilarity measure or a similarity measure 216) determined during an MCTPF analysis stage (e.g., and/or determined by a motion estimator such as described in aspect 1), an overall MMEE value Lg (e.g., representative scalar value 216) for said GOP, e.g., by calculating Lt (e.g., a frame wise measure) for every f of the GOP as in of aspect 1 (e.g., as described with reference to step 1 or any other embodiment) and, then, adopting as Lg the minimum of said $L_f$ of the GOP. The method comprises determining, for each of positions spatially distributed over frames of the group of pictures, a dissimilarity measure or a similarity measure (e.g., block-wise MMEE information) of a comparison of a first frame portion at the respective position, and a second portion of a reference frame to which a motion vector of an estimated motion field at the respective position points. The method further comprises forming a representative scalar value (e.g, $L_G$) based on the dissimilarity measures or similarity measures determined for the positions.

Step 2: Calculate, for each GOP, a noise level equivalent QP, referred to herein as $QP_{noise}$, e.g., via a function $QP_{noise}$=round(3·$\log_2$(resRatio·Lg)), with Lg (e.g., representative scalar value 216) as calculated in step 1 and resRatio being a constant less than or equal to 1 which optionally depends on the coding bit depth (preferred, e.g., being lower for 8-bit than 10-bit) and/or being a video size dependent value (alternative, e.g., resRatio=((width·height)/(3840·2160))$^{0.5}$, with a width and height of the frame f.

Step 3: In the second rate control pass, when calculating the final frame $QP''_f$ values via the R-QP function of [2] based on the first-pass rate and QP data, set $QP_{start}$=$QP_{noise}$+ß, wherein ß may be a negative integer whose value depends on whether denoising such as MCTPF is applied (ß more negative) or not (ß less negative). Alternatively, the negative integer ß may be considered by adjusting the resRatio.

Step 4: (optional) When $QP_{start}$ is lower than 0, set $QP_{start}$=0. Then, use $QP_{start}$ in the R-QP function. The R-QP function may yield, for a given target bit consumption $r'_f$ in the second RC pass, a frame-wise $QP''_f$ for use in the second RC pass depending on the chosen frame $QP_f$ and, resulting therefrom, $r_f$ of the first pass. The function may have two parts, with a first part being $$QP'_f = QP_f - c_{low} \cdot \sqrt{\max(1; QP_f)} \cdot \log_2\left(\frac{r'_f}{r_f}\right)$$

wherein $QP'_f$ is utilized in part 2 below and $c_{low}$≈0.82.

The method comprises determining a preliminary quantization parameter (e.g., $QP'_f$, a function for $QP'_f$, dependent on an intended bit rate $r'_f$, e.g., a value $QP'_f$, determined for an intended bit rate $r'_f$) for the second rate-control pass based on the encoding bitrate (e.g., $r_f$), the further quantization parameter (e.g., $QP_f$) of the first rate-control pass and an intended bitrate (e.g., $r'_f$) for the second rate-control pass.

The second $QP_{start}$-related part of the R-QP model may be:

$$QP''_f = (QP'_f + c_{high} \cdot \max(0; QP_{start} - QP'_f))$$

with a predetermined slope $c_{high}$, which may be between zero and one, such as 0.5.

The method comprises adjusting the preliminary quantization parameter (e.g., adjusting $QP'_f$ in order to determine an adjusted quantization parameter $QP''_f$) using the representative scalar value to obtain the quantization parameter for a second rate-control pass. The steps of determining the preliminary quantization parameter and adjusting preliminary quantization parameter may be performed in a single step (or simultaneously), e.g., by using equation (3) or using an algorithm that realizes equation (3).

It should be noted that the dependence of the above-described embodiment on the activation state of a denoising pre-filter, by way of parameter ß, may also be achieved by introducing said dependence by directly scaling product resRatio·Lg by a ß-equivalent factor greater than zero and less than 1.

For example, the threshold quantization parameter $QP_{start}$ may be determined by the following equation with an offset type parameter ß:

$$QP_{start} = \text{round}(3 \cdot \log_2(resRatio \cdot L_g) + \beta) \quad \text{equation (1)}$$

However, the threshold quantization parameter $QP_{start}$ may be determined by the following equation with a scaling type parameter ß':

$$QP_{start} = \text{round}(3 \cdot \log_2(resRatio \cdot L_g) \cdot \beta') \quad \text{equation (4)}$$

with parameter ß' being a value between zero and one.

Furthermore, it is worth noting that the overall MMEE value Lg may represent an intensity or "energylike" value in a squared-value domain (e.g., when determining a variance of squared differences of luma values, e.g., for determining the dissimilarity measure or a similarity measure 212). In case of Lg being a "sample-like" value in a linear-value domain (e.g., when determining a variance of an absolute difference of luma values, e.g., for determining the dissimilarity measure or a similarity measure 212), which may simplify implementations, Lg may be squared in step 2, which may result in the following equation:

$$QP_{noise} = \text{round}(3 \cdot \log 2(resRatio \cdot L_g^2)). \quad \text{equation (5)}$$

Equation (5) may be adjusted by a parameter ß or ß' as described above (e.g., within the round( )-function).

Aspect 3: Allowing Recovery from Rate Savings Due to Noise Level QP Limiting

As noted, the noise level equivalent QP limiter, or simply noise-level QP clipping, outlined in [5] bears the disadvantage that, in RC scenarios, the target rate may not be reached anymore on some noisy video material. It was discovered that the simple noise-level QP clipping in [5] does not spend bits saved due to the QP limiting in an efficient manner, i.e., it does not reallocate any saved bits to coding blocks with relatively high QPs and, consequently, coding distortion.

Figure 6:
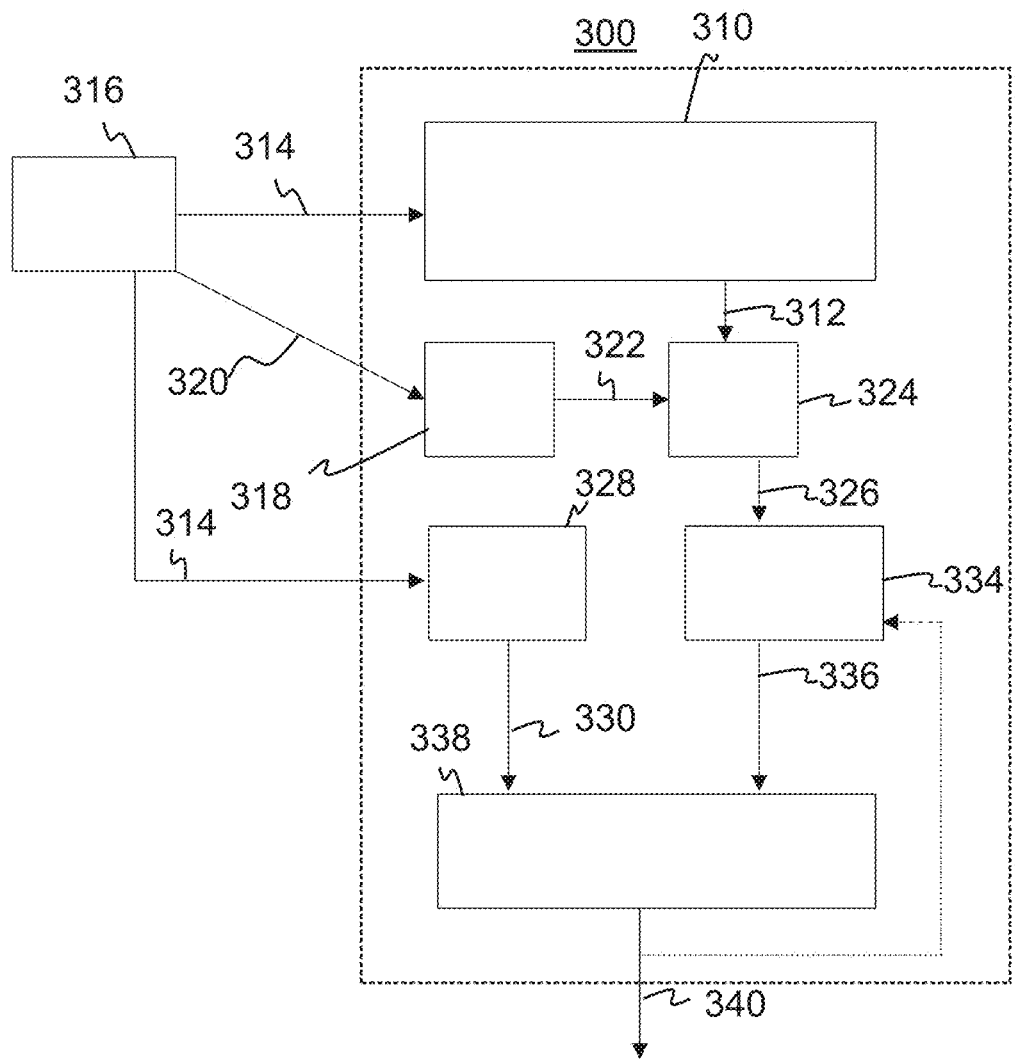
FIG. 6 shows a schematic diagram of an example of an apparatus for determining block-related quantization parameters for a second rate-control pass of a video encoder for a current frame.

FIG. 6 shows a schematic diagram of an example of an apparatus 300 for determining block-related quantization parameters (QP) 340 for a second rate-control pass (e.g., a second rate-control pass as described above in aspect 2) of a video encoder 316 for a current frame.

The apparatus 300 is configured to, for each of blocks into which the current frame is subdivided, determine, e.g., using preliminary QP value determination means 310, a preliminary QP value 312 for a block QP based on first-pass quantization parameter information 314 determined by a first rate-control pass of the video encoder 316 for the respective block. In FIG. 6, the encoder 316 is shown as a component separate from the apparatus 300. However, the apparatus 300 may comprise or be part of the encoder 316.

The preliminary QP value 312 may be determined based on a bit rate and quantization parameter of the first rate-control pass. For example, the preliminary QP value 312 may be determined based on or as the preliminary quantization parameter according to aspect 2, e.g., equation (2) of aspect 2 (or a modified version thereof). However, the preliminary QP value 312 may also be determined as (or based on) an adjusted preliminary quantization parameter according to aspect 2, e.g., equation (3) of aspect 2 (or a modified version thereof).

Figure 7A:
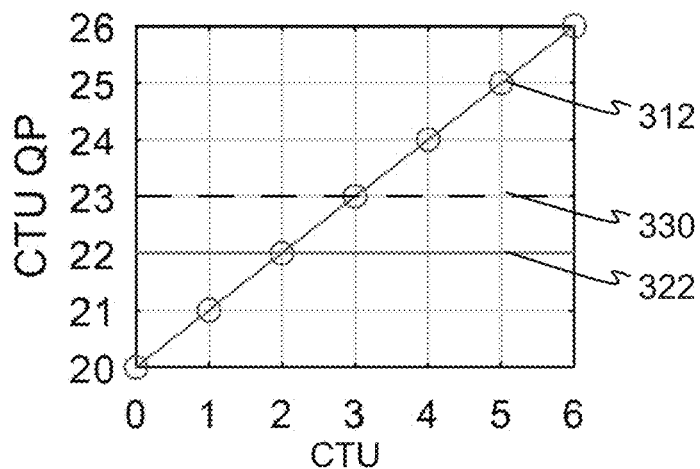
FIG. 7A shows an example of quantization parameters for different coding tree units.

FIG. 7A shows an example of quantization parameters for different coding tree units (CTU). It is noted that the amount and values of the quantization parameters are chosen to form a demonstrative example, but may differ. The preliminary QP values 312 are indicated with circles.

The apparatus 300 is further configure to, for each of blocks into which the current frame is subdivided, determine, e.g., using noise level equivalent QP determination means 318, a noise level equivalent QP 322 based on an analysis of sample statistics 320 within the respective block. In the example shown in FIG. 6, the analysis of sample statistics 320 is provided by the encoder 316. However, any other device (including the apparatus 300) may be configured to determine and/or provide the analysis of sample statistics 320. The sample statistics 320 may be based on sample values (e.g., luma and/or chroma sample values) of only the respective block or of the respective block and one more other blocks.

For example, the apparatus 300 may be configured to determine, for the respective block, a dissimilarity measure or a similarity measure of a comparison of the respective block of the current frame at the respective position, and a second portion (e.g., a block) of a reference frame to which a motion vector (e.g., assigned to the respective block) of an estimated motion field at the respective position points. For example, the apparatus 300 may be configured to determine the dissimilarity measure or a similarity measure 112 as described in aspect 1 or the dissimilarity measure or a similarity measure 212 described in aspect 2.

The analysis of sample statistics 320 may be or may be based on the dissimilarity measure or a similarity measure. The apparatus 300 may be configured to perform all or a portion of the determination of the dissimilarity measure or a similarity measure, wherein, for example, the rest of the determination of the dissimilarity measure or a similarity measure is performed by a different component (e.g., the encoder 316).

The apparatus 300 may be configured to determine the noise level equivalent QP 322 based on the dissimilarity measure or a similarity measure. The apparatus 300 may be configured to determine the noise level equivalent QP 322 based on a function (e.g., a step function) or table that assigns a QP to the dissimilarity measure or a similarity measure. For example, the function or table may define a set (e.g., six, seven, eight, or more) of dissimilarity measures or a similarity measures (e.g., luma regions) that are each assigned a QP for the noise dissimilarity measure or a similarity measure (e.g., a variance of luma differences of the respective block).

The apparatus 300 may be configured to assign each block a respective noise level equivalent QP. Alternatively, the apparatus may be configured to assign a group of blocks (e.g., two, three, four, or more) a common noise level equivalent QP.

For example, the apparatus 300 may be configured to determine, for each of positions spatially distributed over the current frame (or a portion thereof), a dissimilarity measure or a similarity measure of a comparison of a first portion of the current frame at the respective position, and a second portion of a reference frame to which a motion vector of an estimated motion field at the respective position points.

The apparatus 300 may be further configured to form a central value over the dissimilarity measures or a similarity measures determined for the positions, and to determine the noise level equivalent QP 322 based on the central value.

The blocks may be, for example, coding tree units (CTU) or coding units (CU). The group of blocks may be, for example, the frame, a part of the frame, a slice (e.g., a group of CTU), or a CTU (e.g., a group of tree blocks thereof).

In the example shown in FIG. 7A, the noise level equivalent QP 322 is indicated by a solid line (with an exemplary value of 22). For easier understanding of the example shown in FIG. 7A to C, the CTUs 0 to 6 all have a QP of 22. However, it noted that the noise level equivalent QP 322 may vary by block (e.g., by CTU). For example, CTU 1, 4, and 5 may have a QP of 21, CTU 0, 2, 6 may be a QP of 22, and CTU 3 may have a QP of 23. Furthermore, the group of blocks (or CTU) shown in FIG. 7A-C comprises seven blocks. However, the group of blocks may have any other number of blocks (e.g., two, three, four, or more). The group of blocks may have all blocks of the frame. Alternatively, the blocks of the frame may be distributed into multiple groups of blocks (e.g., with the same number or different number of blocks). For example, a group of blocks may be comprise blocks from a slice, or tranch, of the frame. The group of blocks may comprise sub-divided blocks of a CTU (e.g., all subtree blocks of the CTU, e.g., prediction blocks or residual blocks of the CTU).

The apparatus 300 is further configured to, for each of blocks into which the current frame is subdivided, to correct, e.g., using maximum function means 324, the block QP by subjecting the preliminary QP value 312 and the noise level equivalent QP 322 to a maximum function. As a result, the apparatus 300 may be able to determine a set 326 of block QP parameters, wherein one or more values are corrected. For example, the apparatus may be configured to compare the preliminary QP value with the noise level equivalent QP and set the larger of the two QP as a corrected (or adjusted or new) QP of the respective block. The noise level equivalent QP may be indicative of the noise in the respective block. If the noise in the respective block is large, quantification for a highly detailed representation of sample values (e.g., by the use of smaller QP) may not be required. The correction of the block therefore may reduce the risk that smaller QP are used for noisy pictures and therefore may improve coding efficiency.

Figure 7B:
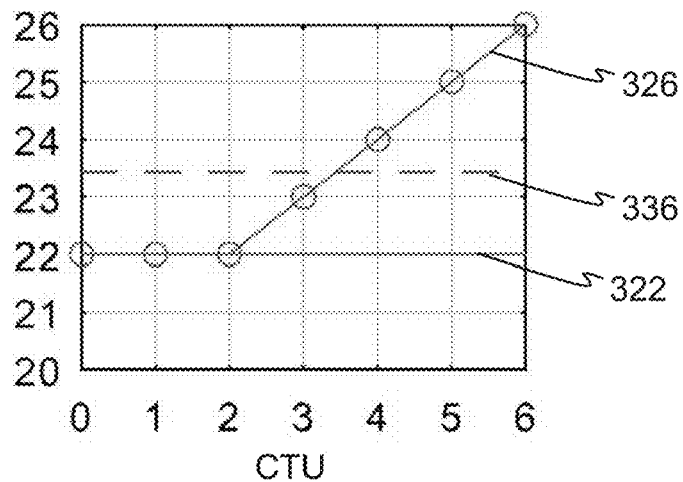
FIG. 7B shows an example of the quantization parameters of FIG. 7A after correcting the block quantization parameter.

FIG. 7B shows an example of the quantization parameters of FIG. 7A after correcting the block QP. The set 326 of corrected block QP parameters is indicated with circles. As can be seen, the QP of CTU 0 and 1 have been corrected (or increased) to the value 22 of the noise level equivalent QP. In a different example, CTU 0 may have a noise level equivalent QP of 21 and CTU 1 has a noise level equivalent QP 22, which may result in the QP of CTU 0 to be corrected to a the values of 21 and the QP of CTU 1 to be corrected to a value of 22. Therefore, it is noted that the QP of CTUs that are corrected are not necessarily (but may be) corrected to a common value.

The apparatus 300 is configured to, for each of one or more groups into which the blocks are grouped, determine, e.g., using a group QP determination means 328, a group QP 330 based on the first-pass quantization parameter information 314. The group QP 330 may be determined as or on a basis on an average (e.g., an arithmetic mean or a geometric mean) of the preliminary QP value 312. In the example shown in FIG. 6, the first-pass quantization parameter information 314 is provided by the encoder 316. However, any other device (including the apparatus 300 or the preliminary QP value determination means 310) may be configured to determine and/or provide the first-pass quantization parameter information 314.

In the example shown in FIG. 7A, the group QP 330 is indicated by a dashed line (with an exemplary value of 23 formed from an average of the preliminary QP values 312). It is noted that the exemplary group QP 330 shown in FIG. 7A happens to be an integer value of 23 due to the example QPs of CTU 0 to 6. However, the group QP may be a non-integer number, e.g., represented by a float, double, or decimal (or other) data type.

The apparatus 300 is configured to, for each of one or more groups into which the blocks are grouped, determine, e.g., using central value determination means 334, a central value 336 over the block QP 326 of the blocks within the respective group. The central value 336 may be a mean value (e.g., arithmetic mean or geometric mean) over the block QP 326 of the blocks within the respective group. In the example shown in FIG. 7B, the central value 336 is indicated by a dashed line. Since the block QP have been subjected to a maximum function, which results in an equal or lager value (compared to the preliminary QP values shown in FIG. 7A), the central value 336 (depicted in FIG. 7B) is larger than the group QP 330 (depicted in FIG. 7A).

The apparatus 300 is configured to, for each of one or more groups into which the blocks are grouped, if the central value exceeds 336 the group QP 330, decrease, e.g., using block QP decreasing means 338, the block QP 330 of one or more blocks within the respective group.

The apparatus 300 may be configured to not decrease the QP from a exclude one or more blocks from decreasing the respective QP. For example, the apparatus 300 may be configured to not decrease the QP of blocks, for which the QP has been corrected, or of blocks with a QP lower than the group QP 330 or the central value 336. To this end, the apparatus may perform a pre-selection of candidate blocks, which does not include the blocks described above. Alternatively or additionally, the apparatus 300 may be configured to check, after identifying a block for which the QP is to be reduced, whether the identified is a block that is to be excluded from the QP reduction. If the identified block is a block to be excluded, the apparatus may subsequently skip said block or otherwise reduce the block QP.

For example, the apparatus 300 may be configured to decrease (e.g., by a value of one, two, three, or larger) at least one block QP 326 within the respective group that fulfils a noise level criterion, wherein, for example, an individual block QP 326 fulfils the noise level criterion when the individual block QP 326 exceeds its noise level equivalent QP 322. However, a different noise level criterion may be used instead. As a result, a new set 340 of block QP may be determined. The new set 340 of block QP may be determined in a single (decreasing) step. Alternatively, the new set 340 may be used to iteratively decrease the block QP 336 of one or more blocks (as indicated by a dashed arrow to the central value determination means 334 in FIG. 6). More specifically, the apparatus 300 may be configured to iteratively decrease the block QP 336 of a block within the respective group which exceeds its noise level equivalent QP 322 and/or the central value 336 of the block QP of the blocks within the respective group, and determine a central value 336 over the block QP of the blocks within the respective group after the block QP 336 of the single block was decreased until an end criterion is fulfilled.

The block QP of the group of blocks may be decreased according to a priority order. For example, the priority for decreasing the QP may depend on the value of the block QP and/or the largest difference between the respective QP and noise level equivalent QP 322. In the example shown in FIG. 7B, the priority order may be CTU 6, 5, 4, and 3 (starting with the CTU that has the highest block QP). The amount that the QP is reduced may be fixed (e.g., always reduced a value of one, two, three, or higher) or may selected based on at least one of the value of the QP, a difference between the respective QP and noise level equivalent QP 322, an iteration progress (e.g., the number of times a QP has been reduced so far), and whether the QP has been already decreased in a previous iteration (e.g., the QP of a block that has been already decreased in a previous iteration is not decreased at all or by a smaller value or decreasing is skipped one or more times).

Figure 7C:
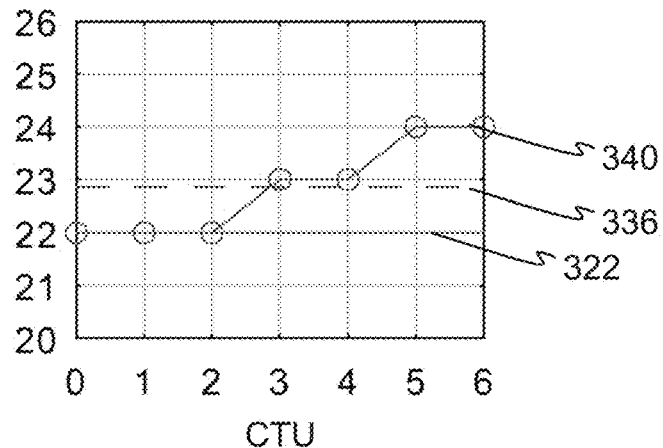
FIG. 7C shows an example of the quantization parameters of FIG. 7A, B after decreasing the block quantization parameter.

FIG. 7C shows an example of the quantization parameters of FIG. 7A, B after decreasing the block QP. The new set 340 of block QP is indicated by circles. In the example shown in FIG. 7C, the QP of CTU 4 and 5 have been decreased by a value of one and the QP of CTU 6 has been decreased by a value of 2. The QP of CTU 6 may have been decreased by a value of two due to its large QP value (e.g., by deciding that a QP larger than 25 is decreased by 2 and that a QP equal or less than 25 is decreased by a value of one). Alternatively, the QP of CTU are always reduced by one (e.g., in an order according to QP value) and after each CTU (e.g., above the central value 336) has been decreased once, further decreasing is performed for CTUs with the largest value, and optionally according to oldest (iteration-wise) previous decrease, wherein the QP of CTU 6 has been decreased one more time. The process of decreasing the block QP may be terminated once one or more end criteria have been met.

A central value 336 determined from the new set 340 of block QP is indicated by a dashed line. The central value 336 in FIG. 7C is smaller than the central value 336 in FIG. 7B, as the decreased QP of CTUs 4, 5, and 6.

The end criterion may comprise at least one condition of the central value 336 is at least essentially equal to or smaller than the group QP 330, and each block QP has been decreased or corrected at least once. For example, the no more decreasing of QP of the blocks may be performed once every block QP (e.g., above the group QP 300 and/or central value 336) has been decreased once, even if the central value 336 is still above the group QP. Alternatively, no restriction to the number of times a block QP may be decreased is used. Since the central value 336 determined from the new set 340 of block QP depicted in FIG. 7C is smaller than the group QP 330, the end criterion may be met and the iteration may stop.

The following example of a rate recovery embodiment, thus, proposes such a bit reallocation:

Step 1: For each coding block unit (CTU) (e.g., blocks of a current frame), obtain (e.g., determine) a noise level equivalent QP, $QP_{ctu}$, e.g. as outlined in prior art [5] (e.g., based on a dissimilarity measure or a similarity measure as described herein). $QP_{ctu}$ may depend on the average luma value in a given CTU, classified into one of 8 luma regions (e.g., wherein each out of eight luma regions is assigned a QP).

Step 2: Clip (e.g., correct), in each CTU, the initial $QP_{init}$ value (e.g., preliminary QP value 312) to $QP_{ctu}$, by enforcing $QP_{init} \geq QP_{ctu}$ (e.g., by subjecting the preliminary QP value 312 and the noise level equivalent QP 322 to a maximum function). Keep track in which CTUs the initial QP is clipped (e.g., using a flag and/or a log). Further, calculate the average (e.g., a central value 336) of all CTU-wise QPs after the clipping operation.

Step 3: If the QP average of step 2 is larger than the targeted QP average (slice QP, e.g., group QP 330), then successively reduce, e.g. by 1, the $QP_{init}$ in CTUs in which $QP_{init}$ hasn't been clipped yet and equals the highest QP value in f.

Step 4: Clip, in each CTU modified in step 3, the reduced $QP_{init}$ value to $QP_{ctu}$, by enforcing $QP_{init} \geq QP_{ctu}$. Keep track in which CTUS $QP_{init}$ is (newly) clipped. Further update the average of all CTU $QP_{init}$ (e.g., new central value 336) after clipping.

Step 5: Update the value of the highest QPs not yet clipped, and run steps 3 and 4 again. Abort this iteration over steps 3 and 4 when either the QP average of step 4 is lower than or equal to the targeted QP average (e.g., a new central value is smaller than or equal to the group QP), or all CTU-wise $QP_{init}$ values have already been clipped in steps 2 or 4. See FIG. 7C for an example. It should be obvious to those skilled in the art that slight modifications especially to step 3 may be beneficial. For instance, after having reduced a $QP_{init}$ value by 1 in step 3, it may, for improved perceptual performance, be desirable to always mark that $QP_{init}$ as (newly) "clipped", so as to ensure that a $QP_{init}$ isn't reduced multiple times.

FIG. 8 shows a flow diagram for a method 400 for determining a screen content coding, SCC, indicator 120 for a current frame of a video.

The method 400 comprises determining 402, for each of positions spatially distributed over the current frame, a dissimilarity measure or a similarity measure 112 of a comparison of a first portion 52 of the current frame 10 at the respective position, and a second portion 54 of a reference frame 50 to which a motion vector 56 of an estimated motion field at the respective position points 52, 54. The method comprises forming 404 a central value 116 over the dissimilarity measures or similarity measures determined for the positions, and determining 406 the SCC indicator 120 based on the central value 116.

FIG. 9 shows a flow diagram for a method 500 for determining a quantization parameter for a second rate-control pass of a video encoder for a group of pictures based on an encoding bitrate and further quantization parameter of a first rate-control pass of the video encoder for the group of pictures.

The method 500 comprises determining 502, for each of positions spatially distributed over frames of the group of pictures, a dissimilarity measure or a similarity measure of a comparison of a first frame portion at the respective position, and a second portion of a reference frame to which a motion vector of an estimated motion field at the respective position points. The method further comprises forming 504 a representative scalar value based on the dissimilarity measures or similarity measures determined for the positions. The method comprises determining 506 a preliminary quantization parameter for the second rate-control pass based on the encoding bitrate, the further quantization parameter of the first rate-control pass and an intended bitrate for the second rate-control pass, and adjusting 508 the preliminary quantization parameter using the representative scalar value to obtain the quantization parameter for a second rate-control pass.

FIG. 10 shows a flow diagram for a method 600 for determining block-related quantization parameters, QP, for a second rate-control pass of a video encoder for a current frame.

The method 600 comprises for each of blocks into which the current frame is subdivided, determining 602 a preliminary QP value 312 for a block QP based on first-pass quantization parameter information 314 determined by a first rate-control pass of the video encoder 316 for the respective block, determining 604 a noise level equivalent QP 322 based on an analysis of sample statistics 320 within the respective block, and correcting 606 the block QP by subjecting the preliminary QP value 312 and the noise level equivalent QP 322 to a maximum function. The method 600 further comprises for each of one or more groups into which the blocks are grouped, determining 608 a group QP 330 based on the first-pass quantization parameter information 314, determining 610 a central value 336 over the block QP 326 of the blocks within the respective group, and if the central value 336 exceeds the group QP 330, decreasing 612 the block QP of one or more blocks within the respective group.

The methods 400, 500, 600 may include any method step and features of aspects 1, 2, and 3, and any method step and feature performed by the apparatuses 100, 200, and 300 disclosed herein.

Additional embodiments and aspects are described which may be used alone or in combination with the features and functionalities described herein.

According to an embodiment, an apparatus for determining a screen content coding, SCC, indicator for a current frame of a video, is configured to determine, for each of positions spatially distributed over the current frame, a dissimilarity measure or a similarity measure of a comparison of a first portion of the current frame at the respective position, and a second portion of a reference frame to which a motion vector of an estimated motion field at the respective position points; form a central value over the dissimilarity measures or similarity measures determined for the positions; determine the SCC indicator based on the central value.

According to an embodiment, the central value is an arithmetic mean, a geometric mean, or root mean square of the dissimilarity measures or similarity measures determined for the positions.

According to an embodiment, the apparatus comprises a motion estimator configured to determine the estimated motion field by, for each of the positions spatially distributed over the current frame, determining, for each of a plurality of candidate motion vectors, a further dissimilarity measure or a further similarity measure of a comparison of the first portion of the current frame at the respective position, and a further second portion of a reference frame to which the respective candidate motion vector points, and appointing, based on an analysis of the further dissimilarity measure or the further similarity measure determined for the plurality of candidate motion vectors, a predetermined motion vector out of the plurality of candidate motion vectors the motion vector of the estimated motion field at the respective position, wherein the apparatus is configured to, for each position, use the further dissimilarity measure or the further similarity measure determined for the predetermined motion vector as the dissimilarity measure or the similarity measure, or the minimum among the further dissimilarity measure or the maximum among the further similarity measure determined for the candidate motion vectors.

According to an embodiment, the apparatus is configured to determine the SCC indicator based on a comparison of the central value with a threshold.

According to an embodiment, the threshold is defined by at least one of a predetermined value between 0 and 100; and on a coding bit depth of the frame, wherein, as an option, the threshold has different values for a sample bit depth of eight bit and a ten bit.

According to an embodiment, the SCC indicator is defined by a binary flag.

According to an embodiment, the apparatus is configured is to determine the SCC indicator only for a plurality of frames that have the same or a lower temporal level.

According to an embodiment, a system for encoding a video, comprises an apparatus for determining an SCC indicator at least for a current frame of the video as described herein, and an encoder configured to encode at least the current frame of the video using the SCC indicator.

According to an embodiment, the encoder is configured to apply a motion compensated temporal pre-filtering, MCTPF, to at least the current frame dependent on the SCC indicator.

According to an embodiment, a method for determining a screen content coding, SCC, indicator for a current frame of a video, comprises determining, for each of positions spatially distributed over the current frame, a dissimilarity measure or a similarity measure of a comparison of a first portion of the current frame at the respective position, and a second portion of a reference frame to which a motion vector of an estimated motion field at the respective position points; forming a central value over the dissimilarity measures or similarity measures determined for the positions; determining the SCC indicator based on the central value.

According to an embodiment, an apparatus for determining a quantization parameter for a second rate-control pass of a video encoder for a group of pictures based on an encoding bitrate and further quantization parameter of a first rate-control pass of the video encoder for the group of pictures, is configured to determine, for each of positions spatially distributed over frames of the group of pictures, a dissimilarity measure or a similarity measure of a comparison of a first frame portion at the respective position, and a second portion of a reference frame to which a motion vector of an estimated motion field at the respective position points; form a representative scalar value based on the dissimilarity measures or similarity measures determined for the positions; determine a preliminary quantization parameter for the second rate-control pass based on the encoding bitrate, the further quantization parameter of the first rate-control pass and an intended bitrate for the second rate-control pass, and adjust the preliminary quantization parameter using the representative scalar value to obtain the quantization parameter for a second rate-control pass.

According to an embodiment, adjusting the preliminary quantization parameter is based on a binary logarithm of the representative scalar value.

According to an embodiment, a threshold quantization parameter $QP_{start}$ as an upper limit for the preliminary quantization parameters to be adjusted is determined based on the following formula:

$$QP_{start} = \mathrm{round}(3 \cdot \log_2(resRatio \cdot L_g) + \beta)$$

with the representative scalar value $L_G$ and a predetermined scaling factor resRatio, which is smaller than or equal to one and dependent either on a coding bit depth or a frame resolution, and $\beta$ is a predetermined negative value.

According to an embodiment, if the threshold quantization parameter $QP_{start}$ is determined to be negative, the threshold quantization parameter is set to zero instead.

According to an embodiment, the adjusted preliminary quantization parameter is defined by two linear relationships between the quantization parameter and a logarithm of the encoding bitrate that meet at the threshold quantization parameter $QP_{start}$, wherein the linear relationship $QP'_f$ above the threshold quantization parameter $QP_{start}$ is defined by the following formula:

$$QP'_f = QP_f - c_{low} \cdot \sqrt{\max(1; QP_f)} \cdot \log_2\left(\frac{r'_f}{r_f}\right),$$

with a predetermined slope $c_{low}$, a quantization parameter of the first rate-control pass $QP_f$, a bit rate of the first rate-control pass $r_f$, and a intended bit rate of the second rate-control pass $r'_f$, and wherein the linear relationship $QP''_f$ below the threshold quantization parameter $QP_{start}$ is defined by the following formula:

$$QP''_f = QP'_f + c_{high} \cdot \max(0; QP_{start} - QP'_f)$$

with a predetermined slope $c_{high}$.

According to an embodiment, a method for determining a quantization parameter for a second rate-control pass of a video encoder for a group of pictures based on an encoding bitrate and further quantization parameter of a first rate-control pass of the video encoder for the group of pictures, comprises determining, for each of positions spatially distributed over frames of the group of pictures, a dissimilarity measure or a similarity measure of a comparison of a first frame portion at the respective position, and a second portion of a reference frame to which a motion vector of an estimated motion field at the respective position points; forming a representative scalar value based on the dissimilarity measures or similarity measures determined for the positions; determining a preliminary quantization parameter for the second rate-control pass based on the encoding bitrate, the further quantization parameter of the first rate-control pass and an intended bitrate for the second rate-control pass; and adjusting the preliminary quantization parameter using the representative scalar value to obtain the quantization parameter for a second rate-control pass.

According to an embodiment, an apparatus for determining block-related quantization parameters, QP, for a second rate-control pass of a video encoder for a current frame, is configured to for each of blocks into which the current frame is subdivided, determine a preliminary QP value for a block QP based on first-pass quantization parameter information determined by a first rate-control pass of the video encoder for the respective block, determine a noise level equivalent QP based on an analysis of sample statistics within the respective block, and correct the block QP by subjecting the preliminary QP value and the noise level equivalent QP to a maximum function. The apparatus is configured, for each of one or more groups into which the blocks are grouped, determine a group QP based on the first-pass quantization parameter information, determine a central value over the block QP of the blocks within the respective group, and if the central value exceeds the group QP, decrease the block QP of one or more blocks within the respective group.

According to an embodiment, the apparatus is configured to decrease at least one block QP within the respective group that fulfils a noise level criterion, wherein an individual block QP fulfils the noise level criterion when the individual block QP exceeds its noise level equivalent QP.

According to an embodiment, the apparatus is configured to determine the group QP based on a mean value of the preliminary QP.

According to an embodiment, the apparatus if further configured to log which block QP have already been decreased, and/or mark the block QP that have already been decreased.

According to an embodiment, the apparatus is configured to iteratively decrease the block QP of a block within the respective group which exceeds its noise level equivalent QP and/or the central value of the block QP of the blocks within the respective group, and determine a central value over the block QP of the blocks within the respective group after the block QP of the single block was decreased until an end criterion is fulfilled.

According to an embodiment, the end criterion comprises at least one condition of the central value is at least essentially equal to or smaller than the group QP, and each block QP has been decreased or corrected at least once.

According to an embodiment, the apparatus is configured to determine, for the respective block, a dissimilarity measure or a similarity measure of a comparison of the respective block of the current frame at a respective position, and a second portion (e.g., block) of a reference frame to which a motion vector of an estimated motion field at the respective position points; and determine the noise level equivalent Q based on the dissimilarity measure or a similarity measure.

According to an embodiment, the apparatus is configured to determine, for each of positions spatially distributed over the current frame, a dissimilarity measure or a similarity measure of a comparison of a first portion of the current frame at the respective position, and a second portion of a reference frame to which a motion vector of an estimated motion field at the respective position points; form a central value over the dissimilarity measures or a similarity measures determined for the positions, and determine the noise level equivalent QP based on the central value.

According to an embodiment, a method for determining block-related quantization parameters, QP, for a second rate-control pass of a video encoder for a current frame, comprises for each of blocks into which the current frame is subdivided, determining a preliminary QP value for a block QP based on first-pass quantization parameter information determined by a first rate-control pass of the video encoder for the respective block, determining a noise level equivalent QP based on an analysis of sample statistics within the respective block, and correcting the block QP by subjecting the preliminary QP value and the noise level equivalent QP to a maximum function. The method further comprises, for each of one or more groups into which the blocks are grouped, determining a group QP based on the first-pass quantization parameter information, determining a central value over the block QP of the blocks within the respective group, and if the central value exceeds the group QP, decreasing the block QP of one or more blocks within the respective group.

General Remarks

Note that, in all of the abovementioned descriptions and proposals, the terms "frame", "picture", "slice", and "image" may be used interchangeably: a frame usually describes a collection of one or more pictures which, in turn, may also be known as an image, and a slice may cover the entirety or a subset of the same. Note, also, that chroma-component data may be used instead of, or in addition to, luma value.

Further Remarks

Above, different inventive embodiments and aspects have been described in a chapter "Reactivation of MCTPF on noisy frames initially classified as SCC", in a chapter "Introduction of dependence of RC method on level of input noise", and in a chapter "Allowing recovery from rate savings due to noise level QP limiting".

Also, further embodiments will be defined by the enclosed claims.

It should be noted that any embodiments as defined by the claims can be supplemented by any of the details (features and functionalities) described in the above mentioned chapters.

Also, the embodiments described in the above mentioned chapters can be used individually, and can also be supplemented by any of the features in another chapter, or by any feature included in the claims.

Also, it should be noted that individual aspects described herein can be used individually or in combination. Thus, details can be added to each of said individual aspects without adding details to another one of said aspects.

It should also be noted that the present disclosure describes, explicitly or implicitly, features usable in video encoder (apparatus for providing an encoded representation of an input video signal). Thus, any of the features described herein can be used in the context of a video encoder.

Moreover, features and functionalities disclosed herein relating to a method can also be used in an apparatus (configured to perform such functionality). Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

IMPLEMENTATION ALTERNATIVES

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES (SEE ALSO REFERENCES THEREIN)

[1] A. Wieckowski, J. Brandenburg, T. Hinz, C. Bartnik, V. George, G. Hege, C. R. Helmrich, A. Henkel, C. Lehmann, C. Stoffers, I. Zupancic, B. Bross, and D. Marpe, "WVenC: An Open and Optimized VVC Encoder Implementation," in Proc. IEEE Int. Conf. Multimedia and Expo (ICME), online, July 2021.

[2] C. R. Helmrich, I. Zupancic, J. Brandenburg, V. George, A. Wieckowski, and B. Bross, "Visually Optimized Two-Pass Rate Control for Video Coding Using the Low-Complexity XPSNR Model," in Proc. IEEE Int. Conf. Visual Communications and Image Processing (VCIP), Munich, Germany, December 2021.

[3] A. Wieckowski, T. Hinz, C. R. Helmrich, B. Bross, and D. Marpe, "An Optimized Temporal Filter Implementation for Practical Applications," in Proc. IEEE Picture Coding Symposium (PCS), San Jose, USA, December 2022. [4] K. Andersson, P. Wennersten, J. Samuelsson, J. Strom, P. Hermansson, and M. Pettersson, "AHG3 Recommended Settings for HM," JCT-VC document JCTVC-X0038 May 2016.

[5] C. R. Helmrich, C. Bartnik, J. Brandenburg, V. George, T. Hinz, C. Lehmann, I. Zupancic, A. Wieckowski, B. Bross, and D. Marpe, "A Scene Change and Noise Aware Rate Control Method for VVenC, an Open VVC Encoder Implementation," in Proc. IEEE Picture Coding Symposium (PCS), San Jose, USA, December 2022.

[6] R. Martin, "An Efficient Algorithm to Estimate the Instantaneous SNR of Speech Signals," in Proc. Euro-Speech, Berlin, Germany, September 1993. www.isca-speech.org/archive_v0/eurospeech_1993/e93_1093.html

[7] P. de Lagrange, "AHG4: Experiments in Preparation of Film Grain Visual Tests," JVET document JVET-AC 0181 January 2023.

The invention claimed is:

1. An apparatus for determining a quantization parameter for a second rate-control pass of a video encoder for a group of pictures based on an encoding bitrate and further quantization parameter of a first rate-control pass of the video encoder for the group of pictures, the apparatus comprising:
a processor and memory, the memory storing instruction code for execution by the processor configuring the apparatus to:
determine, for each of positions spatially distributed over frames of the group of pictures, a dissimilarity measure or a similarity measure of a comparison of a first frame portion at the respective position, and a second portion of a reference frame to which a motion vector of an estimated motion field at the respective position points;
form a representative scalar value based on the dissimilarity measures or similarity measures determined for the positions;
determine a preliminary quantization parameter for the second rate-control pass based on the encoding bitrate, the further quantization parameter of the first rate-control pass and an intended bitrate for the second rate-control pass, and
adjust the preliminary quantization parameter using the representative scalar value (216) to obtain the quantization parameter for a second rate-control pass.

2. The apparatus according to claim 1, wherein adjusting the preliminary quantization parameter is based on a binary logarithm of the representative scalar value.

3. The apparatus according to claim 1, wherein a threshold quantization parameter QPstart as an upper limit for the preliminary quantization parameters to be adjusted is determined based on the following formula:

$$QP_{start} = \text{round}(3 \cdot \log_2(resRatio \cdot L_g) + \beta)$$

with the representative scalar value LG and a predetermined scaling factor resRatio, which is smaller than or equal to one and dependent either on a coding bit depth or a frame resolution, and $\beta$ is a predetermined negative value.

4. The apparatus according to claim 3, wherein, if the threshold quantization parameter QPstart is determined to be negative, the threshold quantization parameter is set to zero instead.

5. The apparatus according to claim 3, wherein the adjusted preliminary quantization parameter is defined by two linear relationships between the quantization parameter and a logarithm of the encoding bitrate that meet at the threshold quantization parameter QPstart
wherein the linear relationship QP'f above the threshold quantization parameter QPstart is defined by the following formula:

$$\llbracket QP' \rrbracket\_f = \llbracket QP \rrbracket\_f - c\_\text{low} \cdot \sqrt{(\max[f_0] (1; \llbracket QP \rrbracket\_f) \cdot \llbracket \log \rrbracket\_2(\llbracket r' \rrbracket\_f/r\_f),}$$

with a predetermined slope clow, a quantization parameter of the first rate-control pass QPf, a bit rate of the first rate-control pass rf, and a intended bit rate of the second rate-control pass r'f, and
wherein the linear relationship QP"f below the threshold quantization parameter QPstart is defined by the following formula:

$$\llbracket QP'' \rrbracket\_f = \llbracket QP' \rrbracket\_f + c\_\text{high} \cdot \max[f_0] (0; \llbracket QP \rrbracket\_\text{start} - \llbracket QP'' \rrbracket\_f)$$

with a predetermined slope chigh.

6. A method for determining a quantization parameter for a second rate-control pass of a video encoder for a group of pictures based on an encoding bitrate and further quantization parameter of a first rate-control pass of the video encoder for the group of pictures, the method comprising
determining, for each of positions spatially distributed over frames of the group of pictures, a dissimilarity measure or a similarity measure of a comparison of a first frame portion at the respective position, and a second portion of a reference frame to which a motion vector of an estimated motion field at the respective position points;
forming a representative scalar value based on the dissimilarity measures or similarity measures determined for the positions;
determining a preliminary quantization parameter for the second rate-control pass based on the encoding bitrate, the further quantization parameter of the first rate-control pass and an intended bitrate for the second rate-control pass; and adjusting the preliminary quantization parameter using the representative scalar value to obtain the quantization parameter for a second rate-control pass.

\* \* \* \* \*